(12) United States Patent
Liu et al.

(10) Patent No.: US 10,326,774 B2
(45) Date of Patent: Jun. 18, 2019

(54) METHOD AND DEVICE FOR TRANSMITTING AND RECEIVING INSTRUCTION INFORMATION

(71) Applicant: KUANG-CHI INTELLIGENT PHOTONIC TECHNOLOGY LTD., Shenzhen (CN)

(72) Inventors: Ruopeng Liu, Shenzhen (CN); Silu Xu, Shenzhen (CN); Weicheng Xu, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 539 days.

(21) Appl. No.: 15/154,965

(22) Filed: May 14, 2016

(65) Prior Publication Data
US 2016/0261610 A1    Sep. 8, 2016

Related U.S. Application Data

(63) Continuation of application No. PCT/CN2014/091137, filed on Nov. 14, 2014.

(30) Foreign Application Priority Data

Nov. 15, 2013  (CN) .......................... 2013 1 0577219
Nov. 15, 2013  (CN) .................... 2013 2 0725887 U

(51) Int. Cl.
*H04L 29/06* (2006.01)
*G06F 3/16* (2006.01)
(Continued)

(52) U.S. Cl.
CPC ............ *H04L 63/126* (2013.01); *G06F 3/165* (2013.01); *G06F 21/31* (2013.01); *G06F 21/44* (2013.01);
(Continued)

(58) Field of Classification Search
CPC ............... H04L 63/126; H04L 63/0853; H04L 63/0876; G06F 3/165; G06F 21/31; G06F 21/44; H04W 12/06
See application file for complete search history.

(56) References Cited

U.S. PATENT DOCUMENTS

2005/0010777 A1    1/2005  Rose et al.
2010/0161468 A1*   6/2010  Hickman ............... G06F 21/445
                                                           705/35
(Continued)

FOREIGN PATENT DOCUMENTS

CN    102355308 A    2/2012
CN    102724367 A    10/2012
(Continued)

OTHER PUBLICATIONS

Kim et al Audio-Based Self-Organizing Authentication for Pervasive Computing: A Cyber-Physical Approach, Sep. 2009, International Conference on Parallel Processing Workshops, pp. 362-369 (Year: 2009).*

(Continued)

*Primary Examiner* — Kenneth W Chang
(74) *Attorney, Agent, or Firm* — Perkins Coie LLP

(57) ABSTRACT

The present application discloses a method and device for transmitting and receiving instruction information. The method for transmitting instruction information includes: acquiring a first audio signal that is output from an audio interface of a mobile terminal and carries first instruction information and/or second instruction information, wherein the first instruction information is used to instruct a receiving device to perform an operation corresponding to the first instruction information, and the second instruction information is used to instruct to send the first instruction information to the receiving device; and generating, according to the acquired first audio signal, a first transmission signal that (Continued)

carries the first instruction information, and sending the first transmission signal to the receiving device, where the first transmission signal is a light signal or a sound wave signal.

13 Claims, 3 Drawing Sheets

(51) Int. Cl.
    *H04W 12/06*     (2009.01)
    *G06F 21/31*     (2013.01)
    *G06F 21/44*     (2013.01)
    *G06F 9/4401*     (2018.01)

(52) U.S. Cl.
    CPC ...... *H04L 63/0853* (2013.01); *H04L 63/0876* (2013.01); *H04W 12/06* (2013.01); *G06F 3/167* (2013.01); *G06F 9/4411* (2013.01)

(56) References Cited

U.S. PATENT DOCUMENTS

| | | | | |
|---|---|---|---|---|
| 2010/0281261 | A1* | 11/2010 | Razzell | H04L 63/0492 713/171 |
| 2011/0321149 | A1* | 12/2011 | Tami | G07C 9/00087 726/9 |
| 2012/0171963 | A1* | 7/2012 | Tsfaty | H04B 11/00 455/41.3 |
| 2012/0225645 | A1 | 9/2012 | Sivan | |
| 2012/0266221 | A1* | 10/2012 | Castelluccia | H04L 9/3271 726/6 |
| 2013/0171930 | A1* | 7/2013 | Anand | H04B 5/0031 455/41.1 |
| 2013/0203345 | A1* | 8/2013 | Fisher | H04B 11/00 455/41.1 |
| 2017/0032367 | A1* | 2/2017 | van Beek | H04B 11/00 |

FOREIGN PATENT DOCUMENTS

| | | |
|---|---|---|
| CN | 102769684 A | 11/2012 |
| CN | 102984702 A | 3/2013 |
| CN | 103294984 A | 9/2013 |
| CN | 103295347 A | 9/2013 |
| CN | 103366423 A | 10/2013 |
| CN | 103810017 A | 5/2014 |
| JP | 2004254103 A | 9/2004 |
| JP | 2005269520 A | 9/2005 |
| JP | 2006217227 A | 8/2006 |
| JP | 2010098447 A | 4/2010 |
| WO | 0205636 A1 | 7/2002 |

OTHER PUBLICATIONS

Korean Patent Office Office Action for application No. 10-2016-7015785, dated Jun. 14, 2016 (English translation not available)., Jan. 26, 2018, 7 pages.
Extended European Search Report of EP application No. 14862239.2, dated Jul. 14, 2017., Jul. 14, 2017, 8 pages.
Japanese Office Action of Patent application No. 2016-531032, dated Jul. 29, 2016 (English translation not available)., Aug. 8, 2016.
European First Examination Report; EP application No. 14862239.2, dated Sep. 6, 2018., Sep. 6, 2018, 5 pages.
"V-moda User's Manual", V-Moda Vamp User's Manual; Dec. 31, 2012; pp. 1-24; XP055387919; URL: https://v-moda.com/content/manuals/vamp/english/vamp_manual.pdf [retrieved Jul. 7, 2017];, Dec. 31, 2012.

* cited by examiner

METHOD AND DEVICE FOR TRANSMITTING AND RECEIVING INSTRUCTION INFORMATION

CROSS REFERENCE TO RELATED APPLICATIONS

This application is a continuation of PCT Application No. PCT/CN2014/091137 filed on Nov. 14, 2014, which claims priority to Chinese patent application No. 201310577219.3 of Nov. 15, 2013 and Chinese patent application No. 201320725887.1 of Nov. 15, 2013, all of which are incorporated herein by reference.

FIELD OF THE INVENTION

The present application relates to the field of security authentication, and in particular, to a method and a device for transmitting and receiving instruction information.

BACKGROUND

In the field of security authentication, a traditional access management system generally uses a smart card such as an integrated circuit IC card (Integrated Circuit Card) as a unique personal identifier to get registered on a distribution platform beforehand. Registered relevant data is saved into an access controller by using a device network connected to the distribution platform. In the foregoing scenario, a user may, when accessing a door, place a held smart card within a valid recognition range of a card reader connected to the access controller, for example, may swing the smart card slightly before the card reader to perform feature recognition. Further, data of the smart card, which is read by the card reader, is transmitted to the access controller, and the access controller implements authentication on the user according to matching between saved registration information and acquired data. In this process, generally, if the matching succeeds, processing is performed normally, namely, an electronic lock is driven to open the door; otherwise, the door keeps closed, and event information may be transmitted to a system such as an alarm system and a monitoring system so that a third party processes the event information.

On the basis of the traditional access control system, a system formed by applying a light-controlled system to access management may be called a photonic access control system. Compared with the traditional access control system, because the photonic access control system avoids inconvenience brought by the smart card—for example, the smart card is recognizable only when it is placed within a valid recognition range of the card reader, the smart card is highly vulnerable to being cracked, and the like, the photonic access control system has merits such as ease of use and high reliability.

A related photonic access control system generally needs to use a mobile terminal such as a mobile phone to save authentication information held by the user, and the mobile phone needs to have a light-emitting device so that a receive end can acquire a light signal sent from the mobile phone. In the related technologies, the light-emitting device is generally a camera flash light of the mobile phone itself. However, the camera flash light of the mobile phone itself is not specially designed for transmitting a light signal, and flash frequency is generally configured by a manufacturer according to an application mode. Therefore, an adaptable sending method needs to be custom-made for each model of the mobile phone, so that a light signal that has frequency and light intensity specified by the receive end can be transmitted and so that the receive end can recognize the light signal correctly. Besides, no camera flash light is installed on mobile phones of some models. Consequently, it is limited that a camera flash light or another built-in light-emitting component of a mobile phone is used to perform light communications, and it is a problem that a same light communications method or a client used for light communications is hardly compatible with a mobile phone of a different model.

No effective solution to the foregoing problem has been put forward so far.

SUMMARY OF THE INVENTION

Embodiments of the present application provide a method and a device for transmitting and receiving instruction information to at least solve a technical problem that the related light communications mode is hardly compatible with a mobile terminal of a different model.

According to one aspect of the embodiments of the present application, a method for transmitting instruction information is provided, including: acquiring a first audio signal that is output from an audio interface of a mobile terminal and carries first instruction information and/or second instruction information, wherein the first instruction information is used to instruct a receiving device to perform an operation corresponding to the first instruction information, and the second instruction information is used to instruct to send the first instruction information to the receiving device; and generating, according to the acquired first audio signal, a first transmission signal that carries the first instruction information, and sending the first transmission signal to the receiving device, where the first transmission signal is a light signal or a sound wave signal.

According to another aspect of the embodiments of the present application, a method for receiving instruction information is provided, including: receiving a first transmission signal that is sent by a sending device and carries first instruction information, wherein the sending device is connected to an audio interface of a mobile terminal, so that the sending device acquires a first audio signal that is output by the mobile terminal from the audio interface and carries the first instruction information and/or second instruction information, where the second instruction information is used to instruct the sending device to send the first transmission signal, where the first transmission signal is a light signal or a sound wave signal; and performing an operation corresponding to the first instruction information according to the received first transmission signal.

According to another aspect of the embodiments of the present application, a sending device of instruction information is provided, including: a first acquiring unit, configured to acquire a first audio signal that is output from an audio interface of a mobile terminal and carries first instruction information and/or second instruction information, wherein the first instruction information is used to instruct a receiving device to perform an operation corresponding to the first instruction information, and the second instruction information is used to instruct to send the first instruction information to the receiving device; and a first transmitting unit, configured to generate, according to the acquired first audio signal, a first transmission signal that carries the first instruction information, and send the first transmission signal to the receiving device, where the first transmission signal is a light signal or a sound wave signal.

According to another aspect of the embodiments of the present application, a receiving device of instruction information is provided, including: a first receiving unit, configured to receive a first transmission signal that is sent by a sending device and carries first instruction information, wherein the sending device is connected to an audio interface of a mobile terminal, so that the sending device acquires a first audio signal that is output by the mobile terminal from the audio interface and carries the first instruction information and/or second instruction information, where the second instruction information is used to instruct the sending device to send the first transmission signal, where the first transmission signal is a light signal or a sound wave signal; and a processing unit, configured to perform an operation corresponding to the first instruction information according to the received first transmission signal.

In the embodiments of the present application, it may be deemed that instruction information is output out of a mobile terminal through an audio interface of the mobile terminal in a form of an audio signal. For example, the instruction information may be output to a light signal generator that is connected to the mobile terminal through the audio interface, and further, an audio signal that carries the instruction information may be converted into a first light signal by using the light signal generator, and then the first light signal is transmitted. In the foregoing scenario, audio interfaces that have similar specifications and a considerable information transmission rate are disposed on a majority of mobile terminals, and therefore, a signal sending method according to the embodiments of the present application is free from a limitation on compatibility and the information transmission rate, where the limitation is caused by a different setting of flash frequency and overall low flash frequency when a light signal is sent by using a camera flash. In this way, a technical problem that the related light communications mode is hardly compatible with a mobile terminal of a different model is solved, an effect of being compatible with mobile terminals of different models is accomplished, and further, an effect of improving the information transmission rate is accomplished. Further, because the information transmission rate is improved, one the one hand, encryption and encoding manners that are more sophisticated can be applied to instruction information that carries authentication information, and security and reliability of an authentication system can be improved, and on the other hand, more user-related information can be carried, and an application scope of the authentication system can be increased.

BRIEF DESCRIPTION OF DRAWINGS

The accompanying drawings described herein are intended for better understanding of the present application, and constitute a part of this application. Exemplary embodiments and descriptions thereof in the present application are intended to interpret the present application and do not constitute any improper limitation on the present application. In the accompanying drawings.

DESCRIPTION OF EMBODIMENTS

The following describes the present application in detail with reference to accompanying drawings and embodiments. It should be noted that the embodiments in this application and features in the embodiments may be combined with each other without conflicts.

Embodiment 1

Figure 1:
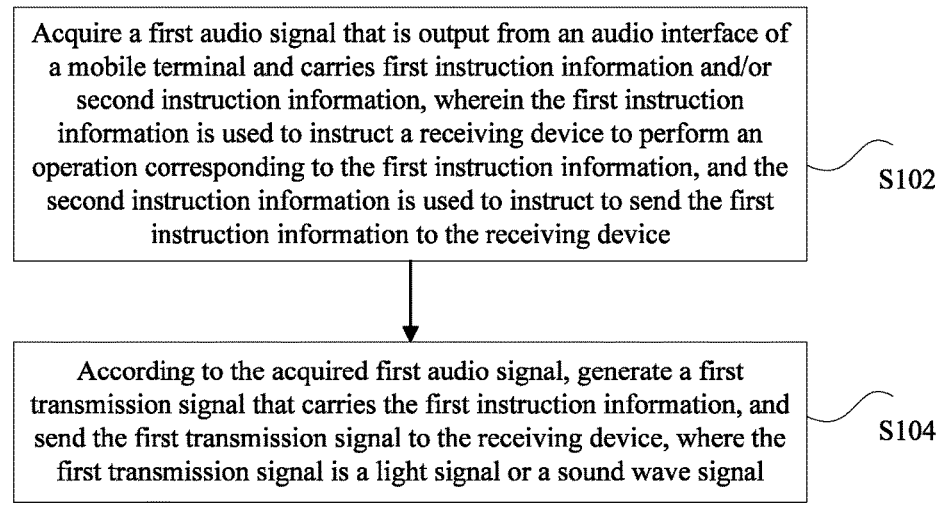
FIG. 1 is a schematic diagram of an optional method for transmitting instruction information according to an embodiment of the present application.

According to the embodiments of the present application, a method for transmitting instruction information is provided. As shown in FIG. 1, the sending method includes:

S102. Acquire a first audio signal that is output from an audio interface of a mobile terminal and carries first instruction information and/or second instruction information, wherein the first instruction information is used to instruct a receiving device to perform an operation corresponding to the first instruction information, and the second instruction information is used to instruct to send the first instruction information to the receiving device.

S104. According to the acquired first audio signal, generate a first transmission signal that carries the first instruction information, and send the first transmission signal to the receiving device, where the first transmission signal is a light signal or a sound wave signal.

It should be understood that one of issues that the technical solution of the present application intends to solve is to provide a method for transmitting instruction information from a mobile terminal to a receiving device, where the instruction information may be used to instruct the receiving device to perform an operation corresponding to the instruction information. In this way, by performing the operation on the mobile terminal on one end, a user can instruct the receiving device to perform one or more corresponding operations. Optionally, multiple types of operations may be performed by the receiving device, and will be described in detail in subsequent embodiments of the present application, which is not limited by the present application. For ease of description, the instruction information is hereinafter referred to as first instruction information.

Multiple solutions to this issue are available in the related technologies. For example, in a traditional mobile terminal application, the issue may be implemented in the following manner: The mobile terminal may use a built-in radio transmitting module and use an electromagnetic wave to carry and send the first instruction information. Alternatively, for a mobile terminal that uses a light communications mode, in order to overcome the problem brought by the preceding manner, the following manner may be applied: The mobile terminal may use a camera flash light or the like and use visible light to carry and send the first instruction information to the receiving device. However, for the latter manner, because light transmitting modules such as camera flash lights that are built in the mobile terminals produced by different manufacturers have different specifications, different light communications solutions need to be designed to match the mobile terminals of different specifications. In other words, the following defect is caused: One method for transmitting instruction information is hardly compatible with a mobile terminal of a different model.

To overcome the defect, in step S102 in a method for transmitting instruction information according to an embodiment of the present application, an audio signal that is output from an audio interface of the mobile terminal and carries the first instruction information may be acquired, where the first instruction information is used to instruct a receiving device to perform an operation corresponding to the first instruction information.

Different from the related technologies, in the embodiment of the present application, the first instruction information is no longer sent by a built-in module or device in a related mobile terminal to the receiving device. Instead, an electrical signal output through an audio interface of the mobile terminal, or in other words, an audio signal, is transmitted to a sending device connected to the audio interface, and then sent by the sending device to the receiving device in a light communications manner. In this process, because the mobile terminals produced by all manufacturers have relatively consistent designs on the audio interface and the manner of outputting the audio signal through the audio interface. Therefore, for the sending device, the same or similar solutions may be applied to both the design on a physical connection to the audio interface and the design on acquisition and recognition of the audio signal output through the audio interface. In this way, the problem that the related light communications mode is hardly compatible with a mobile terminal of a different model is overcome at the end of coupling with the mobile terminal. For ease of description, the audio signal that is output from an audio interface and carries the first instruction information is hereinafter referred to as a first audio signal.

Optionally, in the embodiments of the present application, the manner of transmitting the first audio signal through the audio interface may be user-defined according to a wiring terminal of the audio interface. For a related audio interface, four connection wires are generally disposed: left channel (left), right channel (right), microphone (mic), and ground (GND), where the ground wire is a common connection wire. In the embodiment of the present application, the four connection wires may be used to implement sending and receiving of signals. For example, either the left channel wire or the right channel wire may be connected to a power supply module to provide electrical power for operation of a system, and either of the left channel wire or the right channel wire may be connected to an infrared transmitting unit to implement sending of the signals. Meanwhile, the mic wire may be used as an input wire of the visible light receiving unit to input the received signal into an intelligent terminal such as a mobile phone.

For the foregoing scenario, it should be noted that although the sending device is an external module for the related mobile terminal and is not a conventional design of the related mobile terminal, it does not prevented that a designer implants the sending device into the mobile terminal in a future design solution of the mobile terminal. From this perspective, the audio interface is not necessarily exposed outside the mobile terminal in a well-known manner, such as a audio interface on a shell of a mobile phone, and the audio interface may also be an interface that is disposed inside the mobile terminal, matches the implanted sending device and is configured to output the first audio signal. Further, it should be understood that for both the related audio interface disposed outside the mobile terminal and the audio interface that will possibly come forth in the future and will be disposed inside the mobile terminal, the specific shape and the specific material of the audio interface are diversified, which does not affect the implementation of the technical solution of the present application and fulfillment of technical effects of the technical solution, and the present application does not limit the shape and the material in any way.

In another aspect, based on the same conception, in some embodiments of the present application, the first audio signal acquired from the audio interface of the mobile terminal may not carry the first instruction information, but carry other instruction information that instructs the sending device to send the first instruction information to the receiving device. In this way, the first audio signal that carries the other instruction information may also be acquired in step S102. For ease of description, the other instruction information is hereinafter referred to as second instruction information.

For example, in an embodiment, the first audio signal may carry the first instruction information 00001, where 00001 may represent an instruction code. An operation corresponding to the instruction code, which the receiving device is instructed to perform, may be an unlock operation, or in other words, an unlock signal is sent to the unlock device. In another embodiment, the first audio signal may not carry the first instruction information 00001, but carry a binary code such as 0 or 1 that is used to instruct to send the first instruction information to the receiving device. In this scenario, the first instruction information 00001 to be sent may be pre-stored locally on the sending device so that the sending device responds to the second instruction information acquired from the audio interface, and sends the first instruction information.

Certainly, the foregoing is merely an example for facilitating understanding of the technical solution of the present application, but does not constitute any limitation on the present application. For example, the first instruction information is not limited to the instruction code mentioned above, and may also be a binary code, where a binary code 1 instructs the receiving device to perform an operation, and a binary code 0 instructs the receiving device to be on standby, or the like. In addition, in a scenario that the first audio signal carries the second instruction information but does not carry the first instruction information, the first instruction information may not be stored in a fixed storage area in the sending device, but the first instruction information sent by the receiving device is received temporarily before the first audio signal is acquired, and is written into a buffer or a register for invoking. For example, in a scenario related to a payment service, one end of light communications or sound wave communications is a mobile terminal held in a hand of a paying user, where a sending device is mounted on a audio interface of the mobile terminal, and the other end is a POS (Point of Sale) machine that serves as a receiving device and is operated by a salesperson. Therefore, the salesperson may tell the paying user a payable sum in the payment service first, and at the same time, a disbursable sum corresponding to a disbursement operation that the POS machine is ready to perform is displayed on a user-oriented display screen of the POS machine, and the POS machine is controlled to send temporarily generated first instruction information corresponding to the disbursement operation to the sending device on the mobile terminal. The paying user may press a key indicative of payment confirmation on the mobile terminal only after the paying user determines that the payable sum is reasonable and that the disbursable sum is consistent with the payable sum. In this way, the mobile terminal may generate, according to the user input, a first audio signal that carries second instruction information, and transmit the first audio signal to the sending device through the audio interface. Further, the sending device returns the first instruction information to the POS machine according to the second instruction information in the input first audio signal. Finally, the POS machine completes a sum disbursement operation according to the returned first instruction information. In the foregoing scenario, because the first instruction information is generated temporarily and is not easy to crack, a malicious action performed by cracking the first instruction information corresponding to the sum disbursement operation is restricted. In another aspect, because the first instruction information does not enter the mobile terminal, malicious software installed on the mobile terminal is prevented from stealing the first instruction information, and security of the payment service is further improved.

In addition, in some embodiments of the present application, the first instruction information may be used in combination with the second instruction information. That is, in the step S102, the first audio signal that carries both the first instruction information and the second instruction information may be acquired. In this scenario, the first instruction information and the second instruction information may come from different confirmation mechanisms. For example, the first instruction information corresponding to an unlock operation may come from confirmation of a user identity. For example, after determining that a user fingerprint acquired from a touch screen of the mobile terminal matches a record in a fingerprint database, the mobile terminal may add the first instruction information into the first audio signal. The second instruction information may come from confirmation performed by the user for the unlock operation. For example, after the fingerprint of the user is recorded, the user touches or presses the same area on the touch screen again, which may be recognized by the mobile terminal as a confirmation signal input by the user for confirming the unlock operation, and therefore, the mobile terminal also adds the second instruction information into the first audio signal, and transmits the first audio signal that carries both the first instruction information and the second instruction information to the sending device through the audio interface. In this way, the sending device may, according to the received first audio signal, send to the receiving device the first instruction information used to perform the unlock operation, so that the receiving device completes the unlock operation. In the foregoing scenario, two confirmation mechanisms are used together to complete the unlock operation ultimately, thereby improving reliability of the light communications or sound wave communications process.

On the basis of the foregoing description, according to the sending method provided in the embodiment of the present application, the communications mode described above or below, which is used for transmitting the first instruction information to the receiving device, may be a light communications mode or a sound wave communications mode. That is, after the first audio signal that carries the first instruction information and/or the second instruction information is acquired in the step S102, in the step S104, a transmission signal that carries the first instruction information may be generated according to the acquired first audio signal in the step S104, and the transmission signal may be sent to the receiving device, where the transmission signal may be a light signal or a sound wave signal. For ease of description, the transmission signal is hereinafter referred to as a first transmission signal.

In the foregoing way, in the embodiment of the present application, the issue of compatibility of mobile terminals of different models is solved on the side of coupling between the sending device and the mobile terminal, and light communications or sound wave communications are implemented between the sending device and the receiving device, and therefore, advantages of both aspects are exerted. For example, the light communications mode is not vulnerable to interference and can implement higher bandwidths; and the sound wave communications mode ensures normal completion of communication in a scenario unsuitable for light communications, such as a scenario in which there are many pedestrians or obstacles. In addition, because a task that needs to be performed by the sending device has simple and intuitional logics, the structure of the sending device may be relatively simple, and manufacturing costs of the sending device are relatively low. Therefore, inconvenience of using the sending device for implementing the foregoing sending method is generally avoided for the user.

In the foregoing embodiment, the present application discloses a basic implementation manner, namely, a light communications or sound wave communications mode in which the first instruction information that instructs the receiving device to perform a corresponding operation is transmitted from the sending device to the receiving device. However, considering higher security level requirements and richer function design requirements, in the embodiment of the present application, a function of authenticating the user of the mobile terminal may be implanted into the method for transmitting instruction information. Optionally, authentication information for authenticating the user of the mobile terminal or the mobile terminal is sent in addition to the first instruction information to the receiving device, where the authentication information may be sent together with the first instruction information to the receiving device by using the first transmission signal, or may be sent, before or after the first transmission signal, to the receiving device by another transmission signal, which is not limited in the present application. However, both a sending logic of the first instruction information and a sending logic of the authentication information should correspond to a receiving and processing logic at the end of the receiving device. Obviously unreasonable extensions and expansions for the present application shall not be regarded as limitations on the present application.

Optionally, in one of practicable implementation manners, before the step S102, the sending method may further include:

S202: Acquire a second audio signal that is output from the audio interface and carries authentication information, where the authentication information is used for a receiving device to authenticate a mobile terminal.

S204. According to the acquired second audio signal, generate a second transmission signal that carries the authentication information, and send the second transmission signal to the receiving device, where the receiving device returns third instruction information according to the authentication information, and the second transmission signal is a light signal or a sound wave signal.

The step S102 may be: S206: Acquire the first audio signal if the third instruction information is received.

In the embodiment of the present application, before acquiring the first audio signal and starting the operation of sending the first transmission signal to the receiving device in the step S102 or the step S206, the sending device may first receive the second audio signal that is transmitted by the mobile terminal through the audio interface and carries the authentication information, and send to the receiving device the second transmission signal that carries the authentication information, so that the receiving device authenticates the mobile terminal, and further, the sending device may, after receiving the third instruction information returned by the receiving device after the authentication succeeds, perform an operation of acquiring the first audio signal in the step S206, where the second transmission signal may also be a light signal or a sound wave signal.

Optionally, in the embodiment of the present application, the second transmission signal and the first transmission signal may share a same signal generator or may be generated by different signal generators. For example, in an embodiment, the first transmission signal may be a visible light signal transmitted by a visible light signal generator, and the second transmission signal may be an infrared light signal transmitted by an infrared light signal generator. It should be noted that the light signal mentioned in the foregoing or following embodiments of the present application may include at least one of the following: a visible light signal, an infrared light signal, and an ultraviolet light signal, which is not limited in the present application. All implementation manners based on such applications shall fall within the protection scope of the present application.

In the foregoing scenario, the task of "the receiving device authenticates the mobile terminal" is accomplished before the task of "the mobile terminal sends the first instruction information to the receiving device by using the sending device so that the receiving device performs the corresponding operation", so that the receiving device may perform the indicated operation after confirming legality of the mobile terminal and the user of the mobile terminal, which improves security of the light communications or sound wave communications solution.

The manner used by the receiving device to return the third instruction information to the sending device may be a communications mode of radio, visible light, or invisible light. For example, the third instruction information may be carried by infrared light, and therefore, on the one hand, advantages of a compact structure and low power consumption of an infrared receiving module can be exerted, and on the other hand, visual interference caused to the user of the mobile terminal is avoided, where the visual interference is caused when the third instruction information is returned by using visible light.

Considering higher security level requirements, in another practicable implementation manner in an embodiment of the present application, before the step S102, the sending method may further include:

S202: Acquire a second audio signal that is output from the audio interface and carries authentication information, where the authentication information is used for a receiving device to authenticate a mobile terminal.

S204. According to the acquired second audio signal, generate a second transmission signal that carries the authentication information, and send the second transmission signal to the receiving device, where the receiving device returns third instruction information according to the authentication information, and the second transmission signal is a light signal or a sound wave signal.

The step S102 may be: S302: Receive and authenticate the third instruction information, and acquire the first audio signal if the authentication succeeds.

Compared with the preceding implementation manner, this embodiment differs in that the step S302 is performed in place of the step S206. In other words, in this embodiment, after receiving the third instruction information indicating that the receiving device authenticates the mobile terminal successfully, the sending device does not directly acquire the first differential signal but start the subsequent operations of generating and sending the first transmission signal, but verifies the returned third instruction information first and then starts to acquire the first audio signal after the verification succeeds. In the foregoing scenario, by means of confirming twice, reliability of the light communications or sound wave communications is improved on one hand, and on the other hand, a more sophisticated authentication logic may be further integrated in this embodiment. For example, in an instance of the present application, the information pre-allocated to the mobile terminal is not the authentication information itself, but is an encryption algorithm. The authentication information may include a random code generated by the mobile terminal, and a first code value obtained by the mobile terminal by processing the random code according to the encryption algorithm. After receiving the random code carried in the second transmission signal sent by the sending device, the receiving device may obtain a second code value by processing the random code according to the same encryption algorithm, and return the second code value as the third instruction information to the sending device. Subsequently, if the returned second code value is consistent with the first code value in the authentication information, it is deemed that the verification succeeds, and the operation of acquiring the first audio signal is performed in the step S302; otherwise, it is deemed that the verification fails. In other words, in the embodiment of the present application, the step of receiving and verifying the third instruction information in the step S302 may include:

S402. Receive the third instruction information, and determine whether the received third instruction information matches the authentication information, and if the received third instruction information matches the authentication information, determine that the verification succeeds.

In the foregoing scenario, because the authentication information is not fixed, it is not easy to crack, which further improves security of the light communications or sound wave communications solution. Certainly, the foregoing is merely an example. In other embodiments of the present application, there may be multiple manners of matching between the third instruction information and the authentication information, other verification manners may be applied, the verification processing for the returned third instruction information may be performed not on the sending device, but on the mobile terminal, and so on, which is not described repeatedly in the present application.

Apart from the foregoing implementation manner, in an embodiment of the present application, the first instruction information itself may also be authentication information. After receiving the first instruction information or authentication information, the receiving device may authenticate the mobile terminal or the user of the mobile terminal according to the authentication information, and after the authentication succeeds, perform a corresponding operation, for example, a preset operation corresponding to this type of authentication information, or the like.

In addition, the authentication information used for authenticating the mobile terminal may also be carried, together with the first instruction information, in the first audio signal and transmitted to the sending device, and the sending device sends to the receiving device the first transmission signal that carries the first instruction information and the authentication information. Furthermore, parameter information related to the operation that needs to be performed by the receiving device may be further loaded in the first audio signal and the first transmission signal. For example, optionally, in the embodiment of the present application, the step of generating, according to the acquired first audio signal, a first transmission signal that carries the first instruction information in the step S104 may include:

S502: According to the first audio signal, generate the first transmission signal that carries the first instruction information and the authentication information; or S504: According to the first audio signal, generate the first transmission signal that carries the first instruction information and the parameter information; or S506: According to the first audio signal, generate the first transmission signal that carries the first instruction information, the authentication information, and the parameter information.

In the foregoing operation, the first audio signal further carries authentication information and/or parameter information, where the authentication information is used by the receiving device to authenticate the mobile terminal, and is used by the receiving device to perform, after the authentication succeeds, an operation corresponding to the first instruction information, where the parameter information includes one or more operation parameters that need to be acquired by the receiving device and correspond to the operation.

For example, for a scenario of a payment service, the authentication information may be a payment password of an account currently used by a paying user, and the parameter information may be an account ID of the account, such as an account number of an account or a card number of a bank card corresponding to the account. After the paying user confirms payment, the mobile terminal may output a first audio signal from an audio interface, where the first audio signal carries the payment password, the account ID, as well as the first instruction information, and the first instruction information is used to instruct a POS machine, which serves as a receiving device, to perform a disbursement operation. Or, the first audio signal carries the payment password, the account ID, and the first audio signal, where the first audio signal is used to instruct the sending device, which is connected to the audio interface, to send the second instruction information of the first instruction information. After acquiring any type of first audio signal, the sending device may generate a first transmission signal according to the acquired first audio signal, and send the first transmission signal to the POS machine, where the first transmission signal carries the payment password, the account ID, and the first instruction information. Therefore, the POS machine may parse the received first transmission signal to obtain the payment password, the account ID and the first instruction information according to the received first transmission signal, and use the payment password and the account ID to complete the disbursement operation indicated by the first instruction information. Optionally, the POS machine may send a payment request to a payment service platform, where the payment request carries such parameters.

It should be understood that in the embodiment of the present application in which authentication information or parameter information is mentioned, the first transmission signal should carry the first instruction information that serves an instruction purpose. However, for the authentication information and the parameter information, as mentioned above, the first transmission signal may carry both of them, or carry either of them separately. Correspondingly, the first audio signal may carry the first instruction information or carry the second instruction information, and may carry both the authentication information and the parameter information or carry either of them, which is not limited in the present application. Further, for such information in the first audio signal and the first transmission signal, one or more pieces of information in the signals may be encrypted and/or encoded concurrently or separately, so as to facilitate transmission of the signals and improve the security level of the light communications or sound wave communications solution.

Optionally, in the embodiment of the present application, the encryption and/or encoding performed for the first transmission signal may be performed in at least one of the following manners:

1) If the first audio signal carries the first instruction information but does not carry the authentication information or the parameter information, the step of generating, according to the acquired first audio signal, the first transmission signal that carries the first instruction information in the step S104 may include:

S602. Acquire the first instruction information from the first audio signal.

S604. Generate the first transmission signal according to the acquired first instruction information; or encrypt and/or encode the acquired first instruction information, and generate the first transmission signal according to the encrypted and/or encoded first instruction information.

2) If the first audio signal carries the second instruction information but does not carry the first instruction information, the authentication information or the parameter information, the step of generating, according to the acquired first audio signal, the first transmission signal that carries the first instruction information in the step S104 may include:

S606. Acquire the first instruction information that is received beforehand or pre-stored locally.

S608. Generate the first transmission signal according to the acquired first instruction information; or encrypt and/or encode the acquired first instruction information, and generate the first transmission signal according to the encrypted and/or encoded first instruction information.

3) If the first audio signal carries the first instruction information and the authentication information but does not carry the parameter information, the step S502 may include:

S612. Acquire the first instruction information and the authentication information from the first audio signal.

S614. Generate the first transmission signal according to the acquired first instruction information and authentication information; or encrypt and/or encode the acquired first instruction information and/or authentication information, and generate the first transmission signal according to one of the following pieces of information: the first instruction information or the encrypted and/or encoded first instruction information, and the authentication information or the encrypted and/or encoded authentication information.

4) If the first audio signal carries the second instruction information and the authentication information but does not carry the first instruction information or the parameter information, the step S502 may include:

S616. Acquire the first instruction information that is received beforehand or pre-stored locally, and acquire the authentication information from the first audio signal.

S618. Generate the first transmission signal according to the acquired first instruction information and authentication information; or encrypt and/or encode the acquired first instruction information and/or authentication information, and generate the first transmission signal according to one of the following pieces of information: the first instruction information or the encrypted and/or encoded first instruction information, and the authentication information or the encrypted and/or encoded authentication information.

5) If the first audio signal carries the first instruction information and the parameter information but does not carry the authentication information, the step S504 may include:

S622. Acquire the first instruction information and the parameter information from the first audio signal.

S624. Generate the first transmission signal according to the acquired first instruction information and parameter information; or encrypt and/or encode the acquired first instruction information and/or parameter information, and generate the first transmission signal according to the following information: the first instruction information or the encrypted and/or encoded first instruction information, and the parameter information or the encrypted and/or encoded parameter information.

6) If the first audio signal carries the second instruction information and the parameter information but does not carry the first instruction information or the authentication information, the step S504 may include:

S626. Acquire the first instruction information that is received beforehand or pre-stored locally, and acquire the parameter information from the first audio signal.

S628. Generate the first transmission signal according to the acquired first instruction information and parameter information; or encrypt and/or encode the acquired first instruction information and/or parameter information, and generate the first transmission signal according to the following information: the first instruction information or the encrypted and/or encoded first instruction information, and the parameter information or the encrypted and/or encoded parameter information.

7) If the first audio signal carries the first instruction information, the authentication information and the parameter information, the step S506 may include:

S632. Acquire the first instruction information, the authentication information and the parameter information from the first audio signal.

S634. Generate the first transmission signal according to the acquired first instruction information, authentication information and parameter information; or encrypt and/or encode at least one of following: the acquired first instruction information, authentication information, and parameter information, and generate the first transmission signal according to the following information: the authentication information or the encrypted and/or encoded authentication information, the parameter information or the encrypted and/or encoded parameter information, and the first instruction information or the encrypted and/or encoded first instruction information.

8) If the first audio signal carries the second instruction information, the authentication information and the parameter, but does not carry the first instruction information, the step S506 may include:

S636. Acquire the first instruction information that is received beforehand or pre-stored locally, and acquire the authentication information and the parameter information from the first audio signal.

S638. Generate the first transmission signal according to the acquired first instruction information, authentication information and parameter information; or encrypt and/or encode at least one of following: the acquired first instruction information, authentication information, and parameter information, and generate the first transmission signal according to the following information: the authentication information or the encrypted and/or encoded authentication information, the parameter information or the encrypted and/or encoded parameter information, and the first instruction information or the encrypted and/or encoded first instruction information.

With reference to the description about the encryption and/or encoding processing performed in the foregoing 8 different scenarios, the present application gives a practicable solution to sending of the first transmission signal. Further, in some embodiments of the present application, the mobile terminal may also encrypt the first audio signal output from the audio interface and the first/second instruction information in the first audio signal, and/or the authentication information and/or the parameter information beforehand. In an optional manner, the first instruction information includes at least one encrypted instruction code, and/or the authentication information includes at least one encrypted authentication code, and/or the parameter information includes at least one encrypted value code.

In the foregoing embodiment, there may be multiple practicable encryption manners and encoding manners. For example, in some embodiments of the present application, the encryption manner may be an advanced encryption standard AES (Advanced Encryption Standard) algorithm, and the encoding manner may be a non return zero NRZ (No Return Zero) code, and prepared codes are grouped. For the first transmission signal, a 0 in each group may represent an off state of an indicator, and a 1 may represent an on state of the indicator, where an interval between the 0 and the 1 is an intra-group time interval, and an interval between groups is an inter-group time interval. In a transmission process, the inter-group time interval may be set to be greater than the intra-group time interval, so as to distinguish a valid signal from an invalid interval, which facilitates elimination of misreading on the one hand, and on the other hand, facilitates receiving and decoding performed by an authentication device for the first transmission signal, where the misreading is caused by possible signal inversion between grouped signals, and the authentication device is located on a peer end.

Certainly, this is merely an example. In an embodiment of the present application, different encryption and encoding combinations may be applied. For example, in some embodiments of the present application, an encoding manner of a non return zero inverting NRZI (No Return Zero Inverse) code may be applied, or a Manchester encoding manner may be applied, which is not limited in the present application.

On the basis of the foregoing description, the following describes some specific applications of the method for transmitting instruction information with reference to embodiments.

First, considering possible attenuation and interference problems of a transmission signal in an actual application scenario, both a sending device and a receiving device may be set to accomplish the following effect: A corresponding function design is enabled only when they approach each other within a specified distance range. For example, in an embodiment of the present application, for the sending device, the step S102 may include:

S702. Acquire the first audio signal if an recognition signal indicating that a distance between the mobile terminal and the receiving device is smaller than a preset distance threshold is received; and/or S704. Acquire the first audio signal if a trigger signal sent by the receiving device is received.

The sending device may start to acquire the first audio signal after receiving the recognition signal, where the recognition signal may be a signal that is sent by the receiving device and indicates that the distance between the mobile terminal or the sending device and the receiving device is smaller than a preset distance threshold. Similar to the manner used by the receiving device to return the third instruction information, the manner used by the receiving device to send the recognition signal may be radio, visible light, or invisible light, such as infrared light. The receiving device may simply send an infrared signal that has a specified power and can be recognized by the sending device, and use the infrared signal as a recognition signal. With propagation of the infrared signal, strength of the signal decreases with increase of the distance between the sending device and the receiving device. When the strength of the infrared signal decreases to lower than a strength threshold, it is hardly probable that the sending device connected to the mobile terminal and located in this distance can recognize the recognition signal, and therefore, the sending device beyond this distance generally does not start acquisition of the first audio signal and subsequent sending of the first transmission signal, thereby reducing power consumption of the sending device properly. Further, after recognizing the recognition signal sent by the receiving device, the sending device may further notify the mobile terminal of the state information through an audio interface, so that the mobile terminal can indicate the state to the user. For example, an "available" flag is displayed on a screen of the mobile terminal, or an indicator is turned on, so that the user can start subsequent operations as indicated. In another aspect, the sending device may receive a trigger signal sent by the receiving device, where the trigger signal may carry a trigger instruction, so that the sending device transmits an instruction to the mobile terminal after recognizing the trigger instruction, where the instruction indicates that the sending device is in a "ready-to-send state".

In another aspect, in some embodiments of the present application, the receiving device may send description information of an operation that the receiving device is ready to perform and corresponds to the first instruction information to the sending device beforehand. In this way, the sending device may notify the mobile terminal and the user of the mobile terminal of the description information of the operation, so that the user may understand, according to the description information of the operation, specific content of the operation that the receiving device is ready to perform, for example, a payment sum in a payment service, a payer name corresponding to the payment request, and the like. Therefore, on the one hand, the user can confirm the relevant service conveniently, and on the other hand, the operation at the end of the user can be simplified to selection of "yes" or "no" or the like or multiple choice, thereby bringing better operation experience to the user. In other words, in an embodiment of the present application, before the step S102, the sending method may further include:

S802. Receive first instruction information and/or operation description information of an operation corresponding to the first instruction information;

S804. If the first instruction information is received, temporarily store the received first instruction information locally; and/or S806. If the operation description information is received, transmit the operation description information to a mobile terminal, so that the mobile terminal indicates the operation description information to a user, and so that the mobile terminal generates the first instruction information and/or the second instruction information according to input information of the user and/or the operation description information.

In a specific application scenario of the present application, the operation description information may include at least one of the following: code information, time information, address information, user information, account number information, commodity information, and payment information. The payment information may include at least one of the following: an operation of sending a payment request to a payment service platform; and the operation description information may include at least one of the following: a serial number of the payment request, time information of the payment request, site information corresponding to the payment request, a payment sum corresponding to the payment request, an account ID corresponding to the payment request, account balance information corresponding to the payment request, a payer name corresponding to the payment request, and goods information, magnetic track information, and card number information corresponding to the payment request. Further, in the foregoing scenario, the operation corresponding to the first instruction information may include: sending an operation instruction corresponding to the operation description information to a local or third-party platform, where the third-party platform includes at least one of the following: a payment management platform, a bonus points management platform, and a logistics management platform.

In another aspect, in an embodiment of the present application, the first instruction information and/or the second instruction information may also include voice information input by a first user into the mobile terminal. For example, the user may narrate an instruction orally, and the mobile terminal may recognize that the orally narrated instruction is the corresponding first instruction information and/or second instruction information, and the orally narrated instruction is added into the first audio signal and transmitted to the sending device. Specifically, in some embodiments of the present application, for voice information that serves as the first instruction information, the operation indicated by the voice information may also be to recover the voice information itself by the receiving device, thereby forming a mechanism of transmitting voice information. For example, in an embodiment, the sending device may also send the instruction orally narrated by the user on the mobile terminal, or the orally narrated instruction together with the authentication information and the parameter information to the receiving device by using the first transmission signal, and the receiving device may recover the orally narrated instruction and send it to a person at the end of the receiving device. In addition, in other embodiments, the mechanism of transmitting voice information may also be applied to a voice session that uses the light communications or sound wave communications mode, and the like, which is not limited in the present application.

From the foregoing description, it can be seen that in the embodiment of the present application, the operation corresponding to the first instruction information, which is mentioned above in the method for transmitting instruction information, may include at least one of the following: 1) an operation of outputting an unlock signal to an unlock device; 2) an operation of sending a payment request to a payment service platform; and 3) an operation of outputting the voice information to a second user, where the voice information is recovered from the first transmission signal, and the first instruction information and/or the third second instruction information includes the voice information input by the first user into the mobile terminal. However, it should be understood that any variation of the technical solution of the present application and equivalent implementation manners thereof shall also fall within the protection scope of the present application.

It should be noted that in the embodiment of the present application, the receiving device may also be formed by another mobile terminal, and therefore, the communications mode may also be performed between two mobile terminals, in which one mobile terminal may be connected to the sending device of instruction information, and the other mobile terminal may serve as a receiving device to respond to the former. Still further, a sending function and a receiving function may be set on the two separately, and communications between the two may be not limited to unidirectional sending or receiving, but they serve as two symmetric communications terminals, and a role of either of them may be set and adjusted by setting the communications mode.

It should be noted that the technical solution of the present application may be used together with other related or future technical solutions that are practicable. For example, in the embodiment of the present application, data transmission between the sending device and the mobile terminal may also be performed with reference to other processing logics loaded on the mobile terminal, and other functions such as a user recognition mechanism and a conversation mechanism may be built-in or installed on the mobile terminal. In this way, involved processes can be implemented by inserting such functions between any steps in the communications mode according to design requirements. For example, in an embodiment, the mobile terminal may first require the user to provide identity recognition information such as a verification code, a voice password, a fingerprint, an inter-pupil distance, a facial image. The mobile terminal opens the audio interface or starts the push of the audio signal to the audio interface only after the mobile terminal verifies the identity recognition information successfully and recognizes that the user is a legal user. That is, in the embodiment of the present application, the sending device may combine with the mobile terminal to implement other functions or fulfill design requirements of higher security levels.

In summary, according to the method provided in the embodiment of the present application, for an implementation environment formed by different types of mobile terminals and their receiving devices, at least the following effects can be accomplished:

1) The present application is widely applicable to intelligent terminals with an audio interface, such as tablet computers, notebook computers, and personal computers;

2) By means of the adaptation terminal, bidirectional communications can be implemented between a mobile terminal and an intelligent terminal such as a tablet computer, a notebook computer, and a personal computer to implement information transmission;

3) By access of a light adaptation terminal with an audio interface, authentication functions such as real-name authentication and mobile money can be implemented on a mobile phone, a tablet computer, a notebook computer, and a personal computer;

4) A light adaptation terminal with an audio interface may serve as a startup authentication tool of a computer terminal, thereby avoiding traditional manual input of a password and providing higher confidentiality and security than a traditional manner; and 5) A light adaptation terminal with an audio interface may be used to establish a communications medium between intelligent terminals such as a mobile phone, a tablet computer, a notebook computer, and a personal computer, and implement transmission of information such as files.

Embodiment 2

Figure 2:
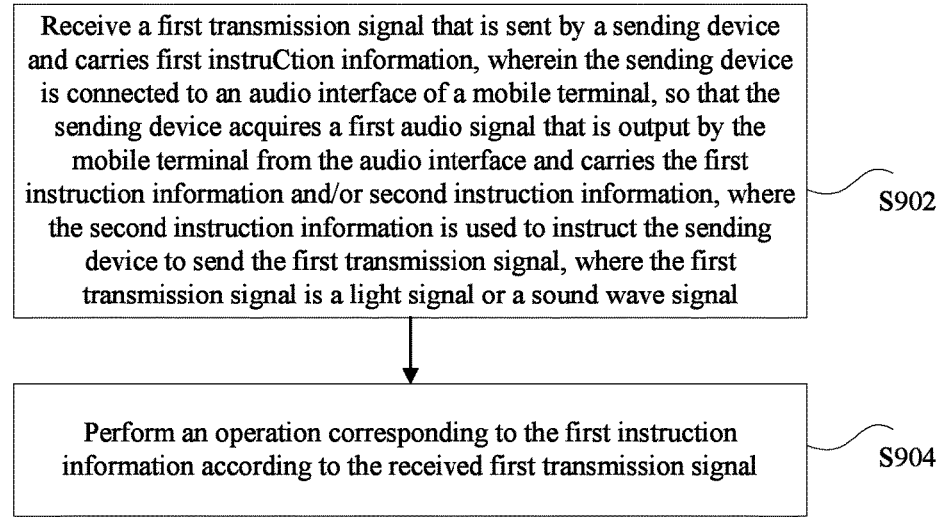
FIG. 2 is a schematic diagram of an optional method for receiving instruction information according to an embodiment of the present application.

According to the embodiment of the present application, a method for receiving instruction information, which corresponds to the method for transmitting instruction information in Embodiment 1, is provided. As shown in FIG. 2, the receiving method includes:

S902. Receive a first transmission signal that is sent by a sending device and carries first instruction information, where the sending device is connected to an audio interface of a mobile terminal, so that the sending device acquires a first audio signal that is output by the mobile terminal from the audio interface and carries the first instruction information and/or second instruction information, where the second instruction information is used to instruct the sending device to send the first transmission signal, where the first transmission signal is a light signal or a sound wave signal.

S904. Perform an operation corresponding to the first instruction information according to the received first transmission signal.

Optionally, in the embodiment of the present application, before the step S902, the receiving method may further include:

S1002. Receive a second transmission signal that is sent by the sending device and carries authentication information, where the second transmission signal is a light signal or a sound wave signal.

S1004. Return third instruction information to the sending device according to the received second transmission signal, so that the sending device acquires the first audio signal after receiving the returned third instruction information, or so that the sending device receives and verifies the returned third instruction information and acquires the first audio signal after the verification succeeds.

Optionally, in the embodiment of the present application, the step S1002 may include:

generating the third instruction information according to a preset rule and according to the authentication information acquired from the second transmission signal, where the third instruction information matches the authentication information, and returning the generated third instruction information to the sending device.

Optionally, in the embodiment of the present application, before the step S902, the receiving method may further include:

S1102. Send operation description information of an operation corresponding to first instruction information to a sending device or a mobile terminal, so that the mobile terminal indicates the operation description information to a user, and so that the mobile terminal generates first instruction information and/or second instruction information according to input information of the user and/or the operation description information.

Optionally, the operation description information may include at least one of the following: code information, time information, address information, user information, account number information, commodity information, and payment information. The payment information may include at least one of the following: an operation of sending a payment request to a payment service platform; and the operation description information may include at least one of the following: a serial number of the payment request, time information of the payment request, site information corresponding to the payment request, a payment sum corresponding to the payment request, an account ID corresponding to the payment request, account balance information corresponding to the payment request, a payer name corresponding to the payment request, and goods information, magnetic track information, and card number information corresponding to the payment request. Further, in the foregoing scenario, the operation corresponding to the first instruction information may include: sending an operation instruction corresponding to the operation description information to a local or third-party platform, where the third-party platform includes at least one of the following: a payment management platform, a bonus points management platform, and a logistics management platform.

In addition, in an embodiment of the present application, the first instruction information and/or the second instruction information may also include voice information input by a first user into the mobile terminal. For example, the user may narrate an instruction orally, and the mobile terminal may recognize that the orally narrated instruction is the corresponding first instruction information and/or second instruction information, and the orally narrated instruction is added into the first audio signal and transmitted to the sending device. Specifically, in some embodiments of the present application, for voice information that serves as the first instruction information, the operation indicated by the voice information may also be to recover the voice information itself by the receiving device, thereby forming a mechanism of transmitting voice information. For example, in an embodiment, the sending device may also send the instruction orally narrated by the user on the mobile terminal, or the orally narrated instruction together with the authentication information and the parameter information to the receiving device by using the first transmission signal, and the receiving device may recover the orally narrated instruction and send it to a person at the end of the receiving device. In addition, in other embodiments, the mechanism of transmitting voice information may also be applied to a voice session that uses the light communications or sound wave communications mode, and the like, which is not limited in the present application.

From the foregoing description, it can be seen that in the embodiment of the present application, the operation corresponding to the first instruction information, which is mentioned above in the method for transmitting instruction information, may include at least one of the following: 1) an operation of outputting an unlock signal to an unlock device; 2) an operation of sending a payment request to a payment service platform; and 3) an operation of outputting the voice information to a second user, where the voice information is recovered from the first transmission signal, and the first instruction information and/or the third second instruction information includes the voice information input by the first user into the mobile terminal. However, it should be understood that any variation of the technical solution of the present application and equivalent implementation manners thereof shall also fall within the protection scope of the present application.

It should be noted that in the embodiment of the present application, the receiving device may also be another mobile terminal, and therefore, the communications mode may also be performed between two mobile terminals, in which one mobile terminal may be connected to the sending device of instruction information, and the other mobile terminal may serve as a receiving device to respond to the former. Optionally, a sending function and a receiving function may be set on the two separately, and communications between the two may be not limited to unidirectional sending or receiving, but they serve as two symmetric communications terminals, and a role of either of them may be set and adjusted by setting the communications mode.

In summary, according to the method provided in the embodiment of the present application, for an implementation environment formed by different types of mobile terminals and their receiving devices, at least the following effects can be accomplished:

1) The present application is widely applicable to intelligent terminals with an audio interface, such as tablet computers, notebook computers, and personal computers;

2) By means of the adaptation terminal, bidirectional communications can be implemented between a mobile terminal and an intelligent terminal such as a tablet computer, a notebook computer, and a personal computer to implement information transmission;

3) By access of a light adaptation terminal with an audio interface, authentication functions such as real-name authentication and mobile money can be implemented on a mobile phone, a tablet computer, a notebook computer, and a personal computer;

4) A light adaptation terminal with an audio interface may serve as a startup authentication tool of a computer terminal, thereby avoiding traditional manual input of a password and providing higher confidentiality and security than a traditional manner; and 5) A light adaptation terminal with an audio interface may be used to establish a communications medium between intelligent terminals such as a mobile phone, a tablet computer, a notebook computer, and a personal computer, and implement transmission of information such as files.

It should be noted that in the embodiment of the present application, the optical signal may include at least one of the following: a visible light signal, an infrared light signal, and an ultraviolet light signal.

Embodiment 3

Figure 3:
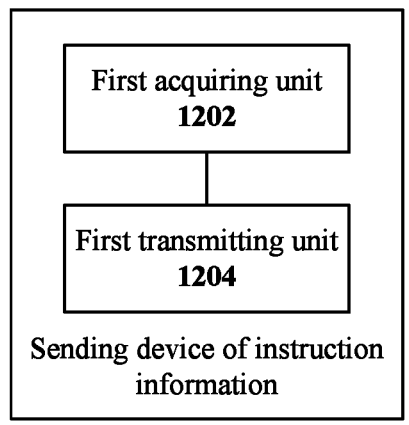
FIG. 3 is a schematic diagram of an optional sending device of instruction information according to an embodiment of the present application.

According to the embodiment of the present application, a sending device of instruction information, which is used to implement the sending method described in Embodiment 1, is provided. As shown in FIG. 3, the sending device includes:

1) a first acquiring unit 1202, configured to acquire a first audio signal that is output from an audio interface of a mobile terminal and carries first instruction information and/or second instruction information, where the first instruction information is used to instruct a receiving device to perform an operation corresponding to the first instruction information, and the second instruction information is used to instruct to send the first instruction information to the receiving device; and 2) a first transmitting unit 1204, configured to generate, according to the acquired first audio signal, a first transmission signal that carries the first instruction information, and send the first transmission signal to the receiving device, where the first transmission signal is a light signal or a sound wave signal.

It should be clear that one of issues that the technical solution of the present application intends to solve is to provide a device for transmitting instruction information from a mobile terminal to a receiving device, where the instruction information may be used to instruct the receiving device to perform an operation corresponding to the instruction information. In this way, by performing the operation on the mobile terminal on one end, a user can instruct the receiving device to perform one or more corresponding operations. Optionally, multiple types of operations may be performed by the receiving device, and will be described in detail in subsequent embodiments of the present application, which is not limited by the present application. For ease of description, the instruction information is hereinafter referred to as first instruction information.

Multiple solutions to this issue are available in the related technologies. For example, in a traditional mobile terminal application, the issue may be implemented in the following manner: The mobile terminal may use a built-in radio transmitting module and use an electromagnetic wave to carry and send the first instruction information. Or, for a mobile terminal that uses a light communications mode, in order to overcome the problem brought by the preceding manner, the following manner may be applied: The mobile terminal may use visible light, with using a camera flash light or the like, to carry and send the first instruction information to the receiving device. However, for the latter manner, because light transmitting modules such as camera flash lights that are built in the mobile terminals produced by different manufacturers have different specifications, different light communications solutions need to be designed to match the mobile terminals of different specifications. In other words, the following defect is caused: One sending device of instruction information is hardly compatible with a mobile terminal of a different model.

To overcome the defect, in the first acquiring unit 1202 in a sending device of instruction information according to an embodiment of the present application, an audio signal that is output from an audio interface of the mobile terminal and carries the first instruction information may be acquired, where the first instruction information is used to instruct a receiving device to perform an operation corresponding to the first instruction information.

Different from the related technologies, in the embodiment of the present application, the first instruction information is no longer sent by a built-in module or device in a related mobile terminal to the receiving device. Instead, an electrical signal output through an audio interface of the mobile terminal, or, an audio signal, is transmitted to a sending device connected to the audio interface, and then sent by the sending device to the receiving device in a light communications or sound wave communications manner. In this process, because the mobile terminals produced by all manufacturers have relatively consistent designs on the audio interface and the manner of outputting the audio signal through the audio interface. Therefore, for the sending device, the same or similar solutions may be applied to both the design on a physical connection to the audio interface and the design on acquisition and recognition of the audio signal output through the audio interface. In this way, the problem that the related light communications mode is hardly compatible with a mobile terminal of a different model is overcome at the end of coupling with the mobile terminal. For ease of description, the audio signal that is output from an audio interface and carries the first instruction information is hereinafter referred to as a first audio signal.

For the foregoing scenario, it should be noted that although the sending device is an external module for the related mobile terminal and is not a conventional design of the related mobile terminal, it does not prevented that a designer implants the sending device into the mobile terminal in a future design solution of the mobile terminal. From this perspective, the audio interface is not necessarily exposed outside the mobile terminal in a well-known manner, such as a audio interface on a housing of a mobile phone, but the audio interface may also be an interface that is disposed inside the mobile terminal, matches the implanted sending device and is configured to output the first audio signal. Further, it should be understood that for both the related audio interface disposed outside the mobile terminal and the audio interface that will possibly come forth in the future and will be disposed inside the mobile terminal, the specific shape and the specific material of the audio interface are diversified, which does not affect implementation of the technical solution of the present application and fulfillment of technical effects of the technical solution, and the present application does not limit the shape and the material in any way.

In another aspect, based on the same conception, in some embodiments of the present application, the first audio signal acquired from the audio interface of the mobile terminal may not carry the first instruction information, but carry other instruction information that instructs the sending device to send the first instruction information to the receiving device. In this way, the first audio signal that carries the other instruction information may also be acquired in the first acquiring unit 1202. For ease of description, the other instruction information is hereinafter referred to as second instruction information.

For example, in an embodiment, the first audio signal may carry the first instruction information 00001, where 00001 may represent an instruction code. An operation corresponding to the instruction code, which the receiving device is instructed to perform, may be an unlock operation, or in other words, an unlock signal is sent to the unlock device. In another embodiment, the first audio signal may not carry the first instruction information 00001, but carry a binary code such as 0 or 1 that is used to instruct to send the first instruction information to the receiving device. In this scenario, the first instruction information 00001 to be sent may be pre-stored locally on the sending device so that the sending device responds to the second instruction information acquired from the audio interface, and sends the first instruction information.

Certainly, the foregoing is merely an example for facilitating understanding of the technical solution of the present application, and does not constitute any limitation on the present application. For example, the first instruction information is not limited to the instruction code mentioned above, and may also be a binary code, where a binary code 1 instructs the receiving device to perform an operation, and a binary code 0 instructs the receiving device to be on standby, or the like. In addition, in a scenario that the first audio signal carries the second instruction information but does not carry the first instruction information, the first instruction information may not be stored in a fixed storage area in the sending device, but the first instruction information sent by the receiving device is received temporarily before the first audio signal is acquired, and is written into a buffer or a register for invoking. For example, in a scenario related to a payment service, one end of light communications or sound wave communications is a mobile terminal held in a hand of a paying user, where a sending device is mounted on a audio interface of the mobile terminal, and the other end is a POS (Point of Sale) machine that serves as a receiving device and is operated by a salesperson. Therefore, the salesperson may tell the paying user a payable sum in the payment service first, and at the same time, a disbursable sum corresponding to a disbursement operation that the POS machine is ready to perform is displayed on a user-oriented display screen of the POS machine, and the POS machine is controlled to send temporarily generated first instruction information corresponding to the disbursement operation to the sending device on the mobile terminal. The paying user may press a key indicative of payment confirmation on the mobile terminal only after the paying user determines that the payable sum is reasonable and that the disbursable sum is consistent with the payable sum. In this way, the mobile terminal may generate, according to the user input, a first audio signal that carries second instruction information, and transmit the first audio signal to the sending device through the audio interface. Further, the sending device returns the first instruction information to the POS machine according to the second instruction information in the input first audio signal. Finally, the POS machine completes a sum disbursement operation according to the returned first instruction information. In the foregoing scenario, because the first instruction information is generated temporarily and is not easy to crack, a malicious action performed by cracking the first instruction information corresponding to the sum disbursement operation is restricted. In another aspect, because the first instruction information does not enter the mobile terminal, malicious software installed on the mobile terminal is prevented from stealing the first instruction information, and security of the payment service is further improved.

In addition, in some embodiments of the present application, the first instruction information and the second instruction information may be used together. That is, in the first acquiring unit 1202, the first audio signal that carries both the first instruction information and the second instruction information may be acquired. In this scenario, the first instruction information and the second instruction information may come from different confirmation mechanisms. For example, the first instruction information corresponding to an unlock operation may come from confirmation of a user identity. For example, after determining that a user fingerprint acquired from a touch screen of the mobile terminal matches a record in a fingerprint database, the mobile terminal may add the first instruction information into the first audio signal. The second instruction information may come from confirmation performed by the user for the unlock operation. For example, after the fingerprint of the user is recorded, the user touches or presses the same area on the touch screen again, which may be recognized by the mobile terminal as a confirmation signal input by the user for confirming the unlock operation, and therefore, the mobile terminal also adds the second instruction information into the first audio signal, and transmits the first audio signal that carries both the first instruction information and the second instruction information to the sending device through the audio interface. In this way, the sending device may, according to the received first audio signal, send to the receiving device the first instruction information used to perform the unlock operation, so that the receiving device completes the unlock operation. In the foregoing scenario, two confirmation mechanisms are used together to complete the unlock operation ultimately, thereby improving reliability of the light communications or sound wave communications process.

On the basis of the foregoing description, according to the sending device provided in the embodiment of the present application, the communications mode described above or below, which is used for transmitting the first instruction information to the receiving device, may be a light communications mode or a sound wave communications mode.

That is, after the first audio signal that carries the first instruction information and/or the second instruction information is acquired by using the first acquiring unit 1202, a transmission signal that carries the first instruction information may be generated according to the acquired first audio signal in the first transmitting unit 1204, and the transmission signal may be sent to the receiving device, where the transmission signal may be a light signal or a sound wave signal. For ease of description, the transmission signal is hereinafter referred to as a first transmission signal.

In this way, in the embodiment of the present application, the issue of compatibility of mobile terminals of different models is solved on the side of coupling between the sending device and the mobile terminal, and light communications or sound wave communications are implemented between the sending device and the receiving device, and therefore, advantages of both aspects are exerted. For example, the light communications mode is not vulnerable to interference and can implement higher bandwidths; and the sound wave communications mode ensures normal completion of communication in a scenario unsuitable for light communications, such as a scenario in which there are many pedestrians or obstacles. In addition, because a task that needs to be performed by the sending device has simple and intuitional logics, the structure of the sending device may be relatively simple, and manufacturing costs of the sending device are relatively low. Therefore, inconvenience of using the sending device for implementing the foregoing sending method is generally avoided for the user.

In the foregoing embodiment, the present application discloses a basic implementation manner, namely, a light communications or sound wave communications mode in which the first instruction information that instructs the receiving device to perform a corresponding operation is transmitted from the sending device to the receiving device. However, considering higher security level requirements and richer function design requirements, in the embodiment of the present application, a function of authenticating the user of the mobile terminal may be implanted into the sending device of instruction information. Optionally, authentication information for authenticating the user of the mobile terminal or the mobile terminal is sent in addition to the first instruction information to the receiving device, where the authentication information may be sent together with the first instruction information to the receiving device by using the first transmission signal, or may be sent, before or after the first transmission signal, to the receiving device by another transmission signal, which is not limited in the present application. However, both a sending logic of the first instruction information and a sending logic of the authentication information should correspond to a receiving and processing logic at the end of the receiving device. Obviously unreasonable extensions and expansions for the present application shall not be regarded as limitations on the present application.

Optionally, in one of practicable implementation manners, before the first acquiring unit 1202, the sending device may include:

1) a second acquiring unit, configured to acquire a second audio signal that is output from the audio interface and carries authentication information, where the authentication information is used to authenticate the mobile terminal; and 2) a second transmitting unit, configured to generate, according to the acquired second audio signal, a second transmission signal that carries the authentication information, and send the second transmission signal to the receiving device, where the receiving device returns third instruction information according to the authentication information, and the second transmission signal is a light signal or a sound wave signal.

The first acquiring unit 1202 may include a first acquiring module, configured to acquire the first audio signal when the third instruction information is received.

In the embodiment of the present application, before acquiring the first audio signal and starting the operation of sending the first transmission signal to the receiving device by using the first acquiring unit 1202 or the first acquiring module, the sending device may first receive the second audio signal that is transmitted by the mobile terminal through the audio interface and carries the authentication information, and send to the receiving device the second transmission signal that carries the authentication information, so that the receiving device authenticates the mobile terminal, and further, the sending device may, after receiving the third instruction information returned by the receiving device after the authentication succeeds, perform an operation of acquiring the first audio signal in the first acquiring module, where the second transmission signal may also be a light signal or a sound wave signal.

Optionally, in the embodiment of the present application, the second transmission signal and the first transmission signal may share a same signal generator or may be generated by different signal generators. For example, in an embodiment, the first transmission signal may be a visible light signal transmitted by a visible light signal generator, and the second transmission signal may be an infrared light signal transmitted by an infrared light signal generator. It should be noted that the light signal mentioned in the foregoing or following embodiments of the present application may include at least one of the following: a visible light signal, an infrared light signal, and an ultraviolet light signal, which is not limited in the present application. All implementation manners based on such applications shall fall within the protection scope of the present application.

In the foregoing scenario, the task of "the receiving device authenticates the mobile terminal" is performed before the task of "the mobile terminal sends the first instruction information to the receiving device by using the sending device so that the receiving device performs the corresponding operation", so that the receiving device may perform the indicated operation after confirming legality of the mobile terminal and the user of the mobile terminal, which improves security of the light communications or sound wave communications solution. The manner used by the receiving device to return the third instruction information to the sending device may be a communications mode of radio, visible light, or invisible light. For example, the third instruction information may be carried by infrared light, and therefore, on the one hand, advantages of a compact structure and low power consumption of an infrared receiving module can be exerted, and on other hand, visual interference caused to the user of the mobile terminal is avoided, where the visual interference is caused when the third instruction information is returned by using visible light.

Considering higher security level requirements, in another practicable implementation manner in an embodiment of the present application, before the first acquiring unit 1202, the sending device may further include:

1) a second acquiring unit, configured to acquire a second audio signal that is output from the audio interface and carries authentication information, where the authentication information is used to authenticate the mobile terminal, so that the receiving device returns third instruction information according to the authentication information; and 2) a second transmitting unit, configured to generate, according to the acquired second audio signal, a second transmission signal that carries the authentication information, and send the second transmission signal to the receiving device, where the receiving device returns third instruction information according to the authentication information, and the second transmission signal is a light signal or a sound wave signal.

The first acquiring unit 1202 includes a verifying module, configured to receive and verify the third instruction information; and a second acquiring module, configured to acquire the first audio signal after the verification succeeds.

Compared with the preceding implementation manner, this embodiment differs in that the verifying module and the second acquiring module replace the first acquiring module. In other words, in this embodiment, after receiving the third instruction information indicating that the receiving device authenticates the mobile terminal successfully, the sending device does not directly acquire the first differential signal but start the subsequent operations of generating and sending the first transmission signal, but verifies the returned third instruction information first and then starts to acquire the first audio signal after the verification succeeds. In the foregoing scenario, by means of confirming twice, reliability of the light communications or sound wave communications is improved on one hand, and on the other hand, a more sophisticated logic may be further integrated in this embodiment. For example, in an instance of the present application, the information pre-allocated to the mobile terminal is not the authentication information itself, but is an encryption algorithm. The authentication information may include a random code generated by the mobile terminal, and a first code value obtained by the mobile terminal by processing the random code according to the encryption algorithm. After receiving the random code carried in the second transmission signal sent by the sending device, the receiving device may obtain a second code value by processing the random code according to the same encryption algorithm, and return the second code value as the third instruction information to the sending device. Subsequently, if the returned second code value is consistent with the first code value in the authentication information, it is deemed that the verification succeeds, and the operation of acquiring the first audio signal is performed by using the second acquiring module; otherwise, it is deemed that the verification fails. In other words, in the embodiment of the present application, the verifying module may include:

1) a determining sub module, configured to receive the third instruction information, and determine whether the received third instruction information matches the authentication information, and when the received third instruction information matches the authentication information, determine that the verification succeeds.

In the foregoing scenario, because the authentication information is not fixed, it is not easy to crack, which further improves security of the light communications or sound wave communications solution. Certainly, the foregoing is merely an example. In other embodiments of the present application, there may be multiple manners of matching between the third instruction information and the authentication information, other verification manners may be applied, the verification processing for the returned third instruction information may be performed not on the sending device, but on the mobile terminal, and so on, which is not described repeatedly in the present application.

Apart from the foregoing implementation manner, in an embodiment of the present application, the first instruction information itself may also be authentication information. After receiving the first instruction information or authentication information, the receiving device may authenticate the mobile terminal or the user of the mobile terminal according to the authentication information, and after the authentication succeeds, perform a corresponding operation, for example, a preset operation corresponding to this type of authentication information, or the like.

In addition, the authentication information used for authenticating the mobile terminal may also be carried, together with the first instruction information, in the first audio signal and transmitted to the sending device, and the sending device sends to the receiving device the first transmission signal that carries the first instruction information and the authentication information. Furthermore, parameter information related to the operation that needs to be performed by the receiving device may be further loaded in the first audio signal and the first transmission signal. For example, optionally, in the embodiment of the present application, the first transmitting unit S1204 may include:

1) a first transmitting module, configured to generate, according to the first audio signal, the first transmission signal that carries the first instruction information and the authentication information; or 2) a second transmitting module, configured to generate, according to the first audio signal, the first transmission signal that carries the first instruction information and the parameter information; or 3) a third transmitting module, configured to generate, according to the first audio signal, the first transmission signal that carries the first instruction information, the authentication information and the parameter information.

The first audio signal further carries authentication information and/or parameter information. The authentication information is used by the receiving device to authenticate the mobile terminal, and is used by the receiving device to perform an operation corresponding to the first instruction information after the authentication succeeds. The parameter information includes one or more operation parameters that need to be acquired by the receiving device and correspond to the operation.

For example, for a scenario of a payment service, the authentication information may be a payment password of an account currently used by a paying user, and the parameter information may be an account ID of the account, such as an account number of an account or a card number of a bank card corresponding to the account. After the paying user confirms payment, the mobile terminal may output a first audio signal from an audio interface, where the first audio signal carries the payment password, the account ID, and the first instruction information, and the first instruction information is used to instruct a POS machine, which serves as a receiving device, to perform a disbursement operation. Alternatively, the first audio signal carries the payment password, the account ID, and the first audio signal, where the first audio signal is used to instruct the sending device, which is connected to the audio interface, to send the second instruction information of the first instruction information. After acquiring any type of first audio signal, the sending device may generate a first transmission signal according to the acquired first audio signal, and send the first transmission signal to the POS machine, where the first transmission signal carries the payment password, the account ID, and the first instruction information. Therefore, the POS machine may parse the received first transmission signal to obtain the payment password, the account ID and the first instruction information according to the received first transmission signal, and use the payment password and the account ID to complete the disbursement operation indicated by the first instruction information. Optionally, the POS machine may send a payment request to a payment service platform, where the payment request carries such parameters.

It should be understood that in the embodiment of the present application in which authentication information or parameter information is mentioned, the first transmission signal should carry the first instruction information that serves an instruction purpose. However, for the authentication information and the parameter information, as mentioned above, the first transmission signal may carry both of them, or carry either of them separately. Correspondingly, the first audio signal may carry the first instruction information or carry the second instruction information, and may carry both the authentication information and the parameter information or carry either of them, which is not limited in the present application. Optionally, for such information in the first audio signal and the first transmission signal, at least one piece of information in the signals may be encrypted and/or encoded concurrently or separately, so as to facilitate transmission of the signals and improve the security level of the light communications or sound wave communications solution.

Optionally, in the embodiment of the present application, the encryption and/or encoding performed for the first transmission signal may be performed in at least one of the following manners:

1) If the first audio signal carries the first instruction information but does not carry the authentication information or the parameter information, the first transmitting unit 1204 may include:

a first acquiring sub module, configured to acquire the first instruction information from the first audio signal; and a first processing sub module, configured to generate the first transmission signal according to the acquired first instruction information; or encrypt and/or encode the acquired first instruction information, and generate the first transmission signal according to the encrypted and/or encoded first instruction information.

2) If the first audio signal carries the second instruction information but does not carry the first instruction information, the authentication information or the parameter information, the first transmitting unit 1204 may include:

a second acquiring sub module, configured to acquire the first instruction information that is received beforehand and/or pre-stored locally; and a second processing sub module, configured to generate the first transmission signal according to the acquired first instruction information; or encrypt and/or encode the acquired first instruction information, and generate the first transmission signal according to the encrypted and/or encoded first instruction information.

3) If the first audio signal carries the first instruction information and the authentication information but does not carry the parameter information, the first transmitting module may include:

a third acquiring sub module, configured to acquire the first instruction information and the authentication information from the first audio signal; and a third processing sub module, configured to generate the first transmission signal according to the acquired first instruction information and authentication information; or encrypt and/or encode the acquired first instruction information and/or authentication information, and generate the first transmission signal according to one of the following pieces of information: the first instruction information or the encrypted and/or encoded first instruction information, and the authentication information or the encrypted and/or encoded authentication information.

4) If the first audio signal carries the second instruction information and the authentication information but does not carry the first instruction information or the parameter information, the first transmitting module may include:

a fourth acquiring sub module, configured to acquire the first instruction information that is received beforehand or pre-stored locally, and acquire the authentication information from the first audio signal; and a fourth processing sub module, configured to generate the first transmission signal according to the acquired first instruction information and authentication information; or encrypt and/or encode the acquired first instruction information and/or authentication information, and generate the first transmission signal according to one of the following pieces of information: the first instruction information or the encrypted and/or encoded first instruction information, and the authentication information or the encrypted and/or encoded authentication information.

5) If the first audio signal carries the first instruction information and the parameter information but does not carry the authentication information, the second transmitting module may include:

a fifth acquiring sub module, configured to acquire the first instruction information and the parameter information from the first audio signal; and a fifth processing sub module, configured to generate the first transmission signal according to the acquired first instruction information and parameter information; or encrypt and/or encode the acquired first instruction information and/or parameter information, and generate the first transmission signal according to the following information: the first instruction information or the encrypted and/or encoded first instruction information, and the parameter information or the encrypted and/or encoded parameter information.

6) If the first audio signal carries the second instruction information and the parameter information but does not carry the first instruction information or the authentication information, the second transmitting module may include:

a sixth acquiring sub module, configured to acquire the first instruction information that is received beforehand or pre-stored locally, and acquire the parameter information from the first audio signal; and a sixth processing sub module, configured to generate the first transmission signal according to the acquired first instruction information and parameter information; or encrypt and/or encode the acquired first instruction information and/or parameter information, and generate the first transmission signal according to the following information: the first instruction information or the encrypted and/or encoded first instruction information, and the parameter information or the encrypted and/or encoded parameter information.

7) If the first audio signal carries the first instruction information, the authentication information and the parameter information, the third transmitting module may include:

a seventh acquiring sub module, configured to acquire the first instruction information, the authentication information and the parameter information from the first audio signal; and a seventh processing sub module, configured to generate the first transmission signal according to the acquired first instruction information, authentication information and parameter information; or encrypt and/or encode at least one of following: the acquired first instruction information, authentication information, and parameter information, and generate the first transmission signal according to the following information: the authentication information or the encrypted and/or encoded authentication information, the parameter information or the encrypted and/or encoded parameter information, and the first instruction information or the encrypted and/or encoded first instruction information.

8) If the first audio signal carries the second instruction information, the authentication information and the parameter, but does not carry the first instruction information, the third transmitting module may include:

an eighth acquiring sub module, configured to acquire the first instruction information that is received beforehand or pre-stored locally, and acquire the authentication information and the parameter information from the first audio signal; and an eighth processing sub module, configured to generate the first transmission signal according to the acquired first instruction information, authentication information and parameter information; or encrypt and/or encode at least one of following: the acquired first instruction information, authentication information, and parameter information, and generate the first transmission signal according to the following information: the authentication information or the encrypted and/or encoded authentication information, the parameter information or the encrypted and/or encoded parameter information, and the first instruction information or the encrypted and/or encoded first instruction information.

With reference to the description about the encryption and/or encoding processing performed in the foregoing 8 different scenarios, the present application gives a practicable solution to sending of the first transmission signal. Optionally, in some embodiments of the present application, the mobile terminal may also encrypt the first audio signal output from the audio interface and the first/second instruction information in the first audio signal, and/or the authentication information and/or the parameter information beforehand. In an optional manner, the first instruction information includes at least one encrypted instruction code, and/or the authentication information includes at least one encrypted authentication code, and/or the parameter information includes at least one encrypted value code.

In the foregoing embodiment, there may be multiple practicable encryption manners and encoding manners. For example, in some embodiments of the present application, the encryption manner may be an AES (Advanced Encryption Standard) algorithm, and the encoding manner may be a NRZ (No Return Zero) code, and prepared codes are grouped. For the first transmission signal, a 0 in each group may represent an off state of an indicator, and a 1 may represent an on state of the indicator, where an interval between the 0 and the 1 is an intra-group time interval, and an interval between groups is an inter-group time interval. In a transmission process, the inter-group time interval may be set to be greater than the intra-group time interval, so as to distinguish a valid signal from an invalid interval, which facilitates elimination of misreading on the one hand, and on the other hand, facilitates receiving and decoding performed by an authentication device for the first transmission signal, where the misreading is caused by possible signal inversion between grouped signals, and the authentication device is located on a peer end.

Certainly, this is merely an example. In an embodiment of the present application, different encryption and encoding combinations may be applied. For example, in some embodiments of the present application, an encoding manner of a NRZI (No Return Zero Inverse) code may be applied, or a Manchester encoding manner may be applied, which is not limited in the present application.

On the basis of the foregoing description, the following describes some specific applications of the sending device of instruction information with reference to embodiments.

First, considering possible attenuation and interference problems of a transmission signal in an actual application scenario, both a sending device and a receiving device may be set to accomplish the following effect: A corresponding function design is enabled only when they approach each other within a specified distance range. For example, in an embodiment of the present application, for the sending device, the first acquiring unit 1202 may include:

1) a third acquiring module, configured to acquire the first audio signal when an recognition signal indicating that a distance between the mobile terminal and the receiving device is smaller than a preset distance threshold is received, and/or acquire the first audio signal when a trigger signal sent by the receiving device is received.

The sending device may start to acquire the first audio signal after receiving the recognition signal, where the recognition signal may be a signal that is sent by the receiving device and indicates that the distance between the mobile terminal or the sending device and the receiving device is smaller than a preset distance threshold. Similar to the manner used by the receiving device to return the third instruction information, the manner used by the receiving device to send the recognition signal may be radio, visible light, or invisible light, such as infrared light. The receiving device may simply send an infrared signal that has a specified power and can be recognized by the sending device, and use the infrared signal as a recognition signal. With propagation of the infrared signal, strength of the signal decreases with increase of the distance between the sending device and the receiving device. When the strength of the infrared signal decreases to lower than a strength threshold, a probability of recognizing the recognition signal by the sending device connected to the mobile terminal and located in this distance is much limited, and therefore, the sending device beyond this distance generally does not start acquisition of the first audio signal and subsequent sending of the first transmission signal, thereby reducing power consumption of the sending device properly. Optionally, after recognizing the recognition signal sent by the receiving device, the sending device may further notify the mobile terminal of the state information through an audio interface, so that the mobile terminal can indicate the state to the user. For example, an "available" flag is displayed on a screen of the mobile terminal, or an indicator is turned on, so that the user can start subsequent operations as indicated. In another aspect, the sending device may receive a trigger signal sent by the receiving device, where the trigger signal may carry a trigger instruction, so that the sending device transmits an instruction to the mobile terminal after recognizing the trigger instruction, where the instruction indicates that the sending device is in a "ready-to-send state".

In another aspect, in some embodiments of the present application, the receiving device may send description information of an operation that the receiving device is ready to perform and corresponds to the first instruction information to the sending device beforehand. In this way, the sending device may notify the mobile terminal and the user of the mobile terminal of the description information of the operation, so that the user may understand, according to the description information of the operation, specific content of the operation that the receiving device is ready to perform, for example, a payment sum in a payment service, a payer name corresponding to the payment request, and the like. Therefore, on the one hand, the user can confirm the relevant service conveniently, and on the other hand, the operation at the end of the user can be simplified to selection of "yes" or "no" or the like or multiple choice, thereby bringing better operation experience to the user. In other words, in an embodiment of the present application, the sending device may further include:

1) a receiving unit, configured to receive the first instruction information and/or operation description information of the operation corresponding to the first instruction information;

2) a storing unit, configured to: when the first instruction information is received, temporarily store the received first instruction information locally; and/or 3) a third transmitting unit, configured to: when the operation description information is received, transmit the operation description information to the mobile terminal, so that the mobile terminal indicates the operation description information to a user, and so that the mobile terminal generates the first instruction information and/or the second instruction information according to input information of the user and/or the operation description information.

Optionally, for the operation in this embodiment, reference may be made to the description in the foregoing embodiment, and no repeated description is given in this embodiment again.

In another aspect, in an embodiment of the present application, the first instruction information and/or the second instruction information may also include voice information input by a first user into the mobile terminal. For example, the user may make an oral instruction, and the mobile terminal may recognize that the oral instruction is the corresponding first instruction information and/or second instruction information, and the oral instruction is added into the first audio signal and transmitted to the sending device. Specifically, in some embodiments of the present application, for voice information that serves as the first instruction information, the operation indicated by the voice information may also be to recover the voice information itself by the receiving device, thereby forming a mechanism of transmitting voice information. For example, in an embodiment, the sending device may also send the oral instruction by the user on the mobile terminal, or the oral instruction together with the authentication information and the parameter information to the receiving device by using the first transmission signal, and the receiving device may recover the oral instruction and send it to a person at the end of the receiving device. In addition, in other embodiments, the mechanism of transmitting voice information may also be applied to a voice session that uses the light communications or sound wave communications mode, and the like, which is not limited in the present application.

Optionally, the sending device of instruction information is an audio interface adaptation terminal, the audio interface adaptation terminal includes an audio connector, the audio connector includes a first sound channel contact, the first sound channel contact is connected to the first transmitting unit, and the first transmitting unit is a light generator or a sound wave generator.

Optionally, the sending device further includes a second sound channel contact and the second transmitting unit connected to the second sound channel contact, where the second transmitting unit is a light generator or a sound wave generator.

Optionally, the sending device further includes a terminal housing connected to one end of the audio connector, where the first transmitting unit and the second transmitting unit are disposed on the terminal housing.

Optionally, the light generator is an infrared light generator, a visible light generator, or an ultraviolet light emitter, and the sound wave generator is an infrasonic generator, an audible wave generator, or an ultrasonic generator.

From the foregoing description, it can be seen that in the embodiment of the present application, the operation corresponding to the first instruction information, which is mentioned above in the sending device of instruction information, may include at least one of the following: 1) an operation of outputting an unlock signal to an unlock device; 2) an operation of sending a payment request to a payment service platform; and 3) an operation of outputting the voice information to a second user, where the voice information is recovered from the first transmission signal, and the first instruction information and/or the third second instruction information includes the voice information input by the first user into the mobile terminal. However, it should be understood that any variation of the technical solution of the present application and equivalent implementation manners thereof shall also fall within the protection scope of the present application.

It should be noted that in the embodiment of the present application, the receiving device may also be formed by another mobile terminal, and therefore, the communications mode may also be performed between two mobile terminals, in which one mobile terminal may be connected to the sending device of instruction information, and the other mobile terminal may serve as a receiving device to respond to the former. Still optionally, a sending function and a receiving function may be set on the two separately, and communications between the two may be not limited to unidirectional sending or receiving, but they serve as two symmetric communications terminals, and a role of either of them may be set and adjusted by setting the communications mode.

In summary, according to the device provided in the embodiment of the present application, for an implementation environment formed by different types of mobile terminals and their receiving devices, at least the following effects can be accomplished:

1) The present application is widely applicable to intelligent terminals with an audio interface, such as tablet computers, notebook computers, and personal computers;

2) By means of the adaptation terminal, bidirectional communications can be implemented between a mobile terminal and an intelligent terminal such as a tablet computer, a notebook computer, and a personal computer to implement information transmission;

3) By access of a light adaptation terminal with an audio interface, authentication functions such as real-name authentication and mobile money can be implemented on a mobile phone, a tablet computer, a notebook computer, and a personal computer;

4) A light adaptation terminal with an audio interface may serve as a startup authentication tool of a computer terminal, thereby avoiding traditional manual input of a password and providing higher confidentiality and security than a traditional manner; and 5) A light adaptation terminal with an audio interface may be used to establish a communications medium between intelligent terminals such as a mobile phone, a tablet computer, a notebook computer, and a personal computer, and implement transmission of information such as files.

Embodiment 4

Figure 4:
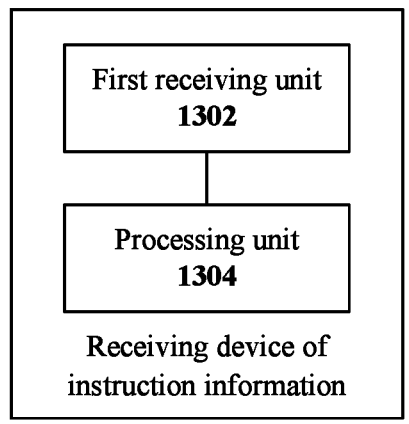
FIG. 4 is a schematic diagram of an optional receiving device of instruction information according to an embodiment of the present application.

According to the embodiment of the present application, a receiving device of instruction information, which is used to implement the receiving method described in Embodiment 2, is provided. As shown in FIG. 4, the receiving device includes:

1) a first receiving unit 1302, configured to receive a first transmission signal that is sent by a sending device and carries first instruction information, wherein the sending device is connected to an audio interface of a mobile terminal, so that the sending device acquires a first audio signal that is output by the mobile terminal from the audio interface and carries the first instruction information and/or second instruction information, where the second instruction information is used to instruct the sending device to send the first transmission signal, where the first transmission signal is a light signal or a sound wave signal; and 2) a processing unit 1304, configured to perform an operation corresponding to the first instruction information according to the received first transmission signal.

Optionally, in the embodiment of the present application, the receiving device may further include:

1) a second receiving unit, configured to receive a second transmission signal that is sent by the sending device and carries authentication information, where the second transmission signal is a light signal or a sound wave signal; and 2) a first transmitting unit, configured to return third instruction information to the sending device according to the received second transmission signal, so that the sending device acquires the first audio signal after receiving the returned third instruction information, or so that the sending device receives and verifies the returned third instruction information and acquires the first audio signal after the verification succeeds.

Optionally, in the embodiment of the present application, the first transmitting unit may include:

1) a transmitting module, configured to generate the third instruction information according to a preset rule and according to the authentication information acquired from the second transmission signal, where the third instruction information matches the authentication information, and return the generated third instruction information to the sending device.

Optionally, in the embodiment of the present application, the receiving device may further include:

1) a second transmitting unit, configured to send operation description information of an operation corresponding to the first instruction information to the sending device or the mobile terminal, so that the mobile terminal indicates the operation description information to a user, and so that the mobile terminal generates the first instruction information and/or the second instruction information according to input information of the user and/or the operation description information.

Optionally, for the operation in this embodiment, reference may be made to the description in the foregoing embodiment, and no repeated description is given in this embodiment again.

In addition, in an embodiment of the present application, the first instruction information and/or the second instruction information may also include voice information input by a first user into the mobile terminal. For example, the user may make an oral instruction, and the mobile terminal may recognize that the oral instruction is the corresponding first instruction information and/or second instruction information, and the oral instruction is added into the first audio signal and transmitted to the sending device. Specifically, in some embodiments of the present application, for voice information that serves as the first instruction information, the operation indicated by the voice information may also be to recover the voice information itself by the receiving device, thereby forming a mechanism of transmitting voice information. For example, in an embodiment, the sending device may also send the oral instruction by the user on the mobile terminal, or the oral instruction together with the authentication information and the parameter information to the receiving device by using the first transmission signal, and the receiving device may recover the oral instruction and send it to a person at the end of the receiving device. In addition, in other embodiments, the mechanism of transmitting voice information may also be applied to a voice session that uses the light communications or sound wave communications mode, and the like, which is not limited in the present application.

Optionally, the receiving device of instruction information is an audio interface adaptation terminal, the audio interface adaptation terminal includes an audio connector, the audio connector includes a mic contact. The mic contact is connected to the first receiving unit, and the first receiving unit is a light receiver or a sound wave receiver.

Optionally, the light receiver is an infrared light receiver, a visible light receiver, or an ultraviolet light receiver, and the sound wave receiver is an infrasonic receiver, an audible wave receiver, or an ultrasonic receiver.

Optionally, the device further includes a terminal housing connected to one end of the audio connector, where the first receiving unit is disposed on the terminal housing.

From the foregoing description, it can be seen that in the embodiment of the present application, the operation corresponding to the first instruction information, which is mentioned above in the sending device of instruction information, may include at least one of the following: 1) an operation of outputting an unlock signal to an unlock device; 2) an operation of sending a payment request to a payment service platform; and 3) an operation of outputting the voice information to a second user, where the voice information is recovered from the first transmission signal, and the first instruction information and/or the third second instruction information includes the voice information input by the first user into the mobile terminal. However, it should be understood that any variation of the technical solution of the present application and equivalent implementation manners thereof shall also fall within the protection scope of the present application.

It should be noted that in the embodiment of the present application, the receiving device may also be another mobile terminal, and therefore, the communications mode may also be performed between two mobile terminals, in which one mobile terminal may be connected to the sending device of instruction information, and the other mobile terminal may serve as a receiving device to respond to the former. Optionally, a sending function and a receiving function may be set on the two separately, and communications between the two may be not limited to unidirectional sending or receiving, but they serve as two symmetric communications terminals, and a role of either of them may be set and adjusted by setting the communications mode.

In summary, according to the device provided in the embodiment of the present application, for an implementation environment formed by different types of mobile terminals and their receiving devices, at least the following effects can be accomplished:

1) The present application is widely applicable to intelligent terminals with an audio interface, such as tablet computers, notebook computers, and personal computers;

2) By means of the adaptation terminal, bidirectional communications can be implemented between a mobile terminal and an intelligent terminal such as a tablet computer, a notebook computer, and a personal computer to implement information transmission;

3) By access of a light adaptation terminal with an audio interface, authentication functions such as real-name authentication and mobile money can be implemented on a mobile phone, a tablet computer, a notebook computer, and a personal computer;

4) A light adaptation terminal with an audio interface may serve as a startup authentication tool of a computer terminal, thereby avoiding traditional manual input of a password and providing higher confidentiality and security than a traditional manner; and 5) A light adaptation terminal with an audio interface may be used to establish a communications medium between intelligent terminals such as a mobile phone, a tablet computer, a notebook computer, and a personal computer, and implement transmission of information such as files.

It should be noted that in the embodiment of the present application, the optical signal may include at least one of the following: a visible light signal, an infrared light signal, and an ultraviolet light signal.

Embodiment 5

Figure 5:
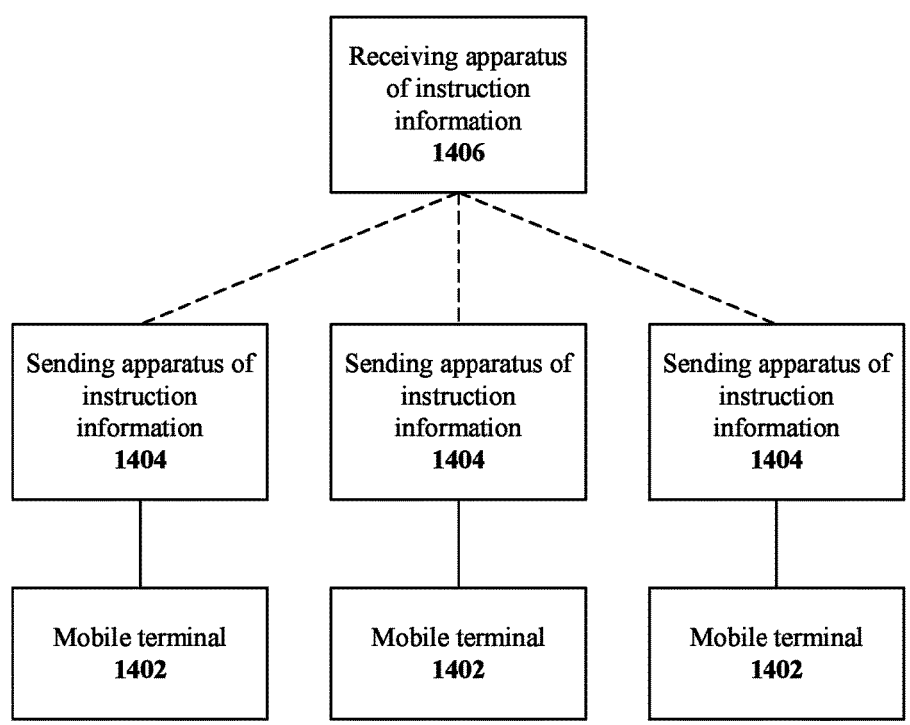
FIG. 5 is a schematic diagram of an optional communications system according to an embodiment of the present application.

According to the embodiment of the present application, a communications system is provided. As shown in FIG. 5, the communications system includes:

1) a mobile terminal 1402, on which an audio interface is disposed;

2) a sending device 1404 of instruction information according to Embodiment 3, connected to the audio interface of the mobile terminal 1402; and 3) a receiving device 1406 of instruction information according to Embodiment 4, which communicates with the sending device 1404 by using a light signal or a sound wave signal.

In the embodiment of the present application, a mobile terminal 1402, a sending device 1404 connected to an audio interface of the mobile terminal 1402, and a receiving device 1406 that communicates with the sending device 1404 or the mobile terminal 1402 and the sending device 1404 may form a communications system. In the system, unidirectional communications that transmit information from the mobile terminal 1402 to the receiving device 1406 by using the sending device 1404 can be implemented, and the bidirectional communications between the mobile terminal 1402 and the receiving device 1404 can be implemented by using the sending device 1404, which is not limited by the present application. Optionally, in the embodiment of the present application, the sending device 1404 may be the sending device mentioned in Embodiment 3, the receiving device 1406 may be the receiving device mentioned in Embodiment 4, which are not described repeatedly herein. The mobile terminal 1402 may be a mobile terminal with an audio interface regardless of a specific model of the mobile terminal 1402. That is, in the communications system, compatibility with the mobile terminal is implemented. It should be noted that in some embodiments of the present application, the receiving device 1404 may also be moveable, for example, may be formed by another mobile terminal, which is not limited by the present application.

The present application provides some preferred embodiments to further interpret the present application. However, it should be noted that the preferred embodiments are intended only to better describe the present application but do not constitute any improper limitation on the present application.

The foregoing descriptions are merely exemplary embodiments of the present application, but are not intended to limit the present application. Persons skilled in the art understand that the present application may have various modifications and variations. Any modification, equivalent replacement, and improvement made without departing from the spirit and principle of the present application shall fall within the protection scope of the present application.

INDUSTRIAL APPLICABILITY

A signal sending method according to the embodiments of the present application is free from a limitation on compatibility and the information transmission rate, where the limitation is caused by a different setting of flash frequency and overall low flash frequency when a light signal is sent by using a camera flash. In this way, a technical problem that the related light communications mode is hardly compatible with a mobile terminal of a different model is solved, an effect of being compatible with mobile terminals of different models is accomplished, and further, an effect of improving the information transmission rate is accomplished. Further, because the information transmission rate is improved, on one hand, encryption and encoding manners that are more sophisticated can be applied to instruction information that carries authentication information, and security and reliability of an authentication system can be improved, and on the other hand, more user-related information can be carried, and an application scope of the authentication system can be increased.

What is claimed is:

1. A method for transmitting instruction information, comprising:
   acquiring a first audio signal that is output from an audio interface of a mobile terminal and carries first instruction information and/or second instruction information, wherein the first instruction information is used to instruct a receiving device to perform an operation corresponding to the first instruction information, and the second instruction information is used to instruct to send the first instruction information to the receiving device; and
   generating, according to the acquired first audio signal, a first transmission signal that carries the first instruction information, and sending the first transmission signal to the receiving device, where the first transmission signal is a light signal or a sound wave signal;
   wherein before the acquiring a first audio signal that is output from an audio interface of a mobile terminal and carries first instruction information and/or second instruction information, the method further comprises:
   acquiring a second audio signal that is output from the audio interface and carries authentication information, where the authentication information is used to authenticate the mobile terminal; and
   generating, according to the acquired second audio signal, a second transmission signal that carries the authentication information, and sending the second transmission signal to the receiving device, where the receiving device returns third instruction information according to the authentication information, and the second transmission signal is a light signal or a sound wave signal, where
   the acquiring a first audio signal that is output from an audio interface of the mobile terminal and carries first instruction information and/or second instruction information comprises: acquiring the first audio signal if the third instruction information is received.

2. The method according to claim 1, wherein the first audio signal further carries authentication information and/or parameter information, where the authentication information is used by the receiving device to authenticate the mobile terminal, and is used by the receiving device to perform, after the authentication succeeds, an operation corresponding to the first instruction information, where the parameter information comprises one or more operation parameters that need to be acquired by the receiving device and correspond to the operation, and the generating, according to the acquired first audio signal, a first transmission signal that carries the first instruction information comprises:
   generating, according to the first audio signal, the first transmission signal that carries the first instruction information and the authentication information; or
   generating, according to the first audio signal, the first transmission signal that carries the first instruction information and the parameter information; or
   generating, according to the first audio signal, the first transmission signal that carries the first instruction information, the authentication information, and the parameter information.

3. The method according to claim 1, wherein the acquiring a first audio signal that is output from an audio interface of a mobile terminal and carries first instruction information and/or second instruction information comprises:
   acquiring the first audio signal if a recognition signal indicating that a distance between the mobile terminal and the receiving device is smaller than a preset distance threshold is received; and/or
   acquiring the first audio signal if a trigger signal sent by the receiving device is received.

4. The method according to claim 1, wherein before the acquiring a first audio signal that is output from an audio interface of a mobile terminal and carries first instruction information and/or second instruction information, the method further comprises:
   receiving the first instruction information and/or operation description information of the operation corresponding to the first instruction information;
   if the first instruction information is received, temporarily storing the received first instruction information locally; and/or
   if the operation description information is received, transmitting the operation description information to the mobile terminal, so that the mobile terminal indicates the operation description information to a user, and so that the mobile terminal generates the first instruction information and/or the second instruction information according to input information of the user and/or the operation description information.

5. A method for receiving instruction information, comprising:
   receiving a first transmission signal that is sent by a sending device and carries first instruction information, wherein the sending device is connected to an audio interface of a mobile terminal, so that the sending device acquires a first audio signal that is output by the mobile terminal from the audio interface and carries the first instruction information and/or second instruction information, where the second instruction information is used to instruct the sending device to send the first transmission signal, where the first transmission signal is a light signal or a sound wave signal; and performing an operation corresponding to the first instruction information according to the received first transmission signal;

wherein before the receiving a first transmission signal that is sent by a sending device and carries first instruction information, the method further comprises:

receiving a second transmission signal that is sent by the sending device and carries authentication information, where the second transmission signal is a light signal or a sound wave signal; and returning third instruction information to the sending device according to the received second transmission signal, so that the sending device acquires the first audio signal after receiving the returned third instruction information, or so that the sending device receives and verifies the returned third instruction information and acquires the first audio signal after the verification succeeds.

6. The method according to claim 5, wherein before the receiving a first transmission signal that is sent by a sending device and carries first instruction information, the method further comprises:

sending operation description information of an operation corresponding to the first instruction information to the sending device or the mobile terminal, so that the mobile terminal indicates the operation description information to a user, and so that the mobile terminal generates the first instruction information and/or the second instruction information according to input information of the user and/or the operation description information.

7. A sending and receiving device of instruction information, the sending device comprising:

a first acquiring unit, configured to acquire a first audio signal that is output from an audio interface of a mobile terminal and carries first instruction information and/or second instruction information, wherein the first instruction information is used to instruct a receiving device to perform an operation corresponding to the first instruction information, and the second instruction information is used to instruct to send the first instruction information to the receiving device; and a first transmitting unit, configured to generate, according to the acquired first audio signal, a first transmission signal that carries the first instruction information, and send the first transmission signal to the receiving device, where the first transmission signal is a light signal or a sound wave signal;

the receiving device comprises:

a first receiving unit, configured to receive a first transmission signal that is sent by a sending device and carries first instruction information, wherein the sending device is connected to an audio interface of a mobile terminal, so that the sending device acquires a first audio signal that is output by the mobile terminal from the audio interface and carries the first instruction information and/or second instruction information, where the second instruction information is used to instruct the sending device to send the first transmission signal, where the first transmission signal is a light signal or a sound wave signal; and a processing unit, configured to perform an operation corresponding to the first instruction information according to the received first transmission signal;

a second acquiring unit, configured to acquire a second audio signal that is output from the audio interface and carries authentication information, wherein the authentication information is used to authenticate the mobile terminal; and a second transmitting unit, configured to generate, according to the acquired second audio signal, a second transmission signal that carries the authentication information, and send the second transmission signal to the receiving device, where the receiving device returns third instruction information according to the authentication information, and the second transmission signal is a light signal or a sound wave signal, where the first acquiring unit comprises a first acquiring module, configured to acquire the first audio signal when the third instruction information is received.

8. The sending device according to claim 7, wherein the first audio signal further carries authentication information and/or parameter information, where the authentication information is used by the receiving device to authenticate the mobile terminal, and is used by the receiving device to perform, after the authentication succeeds, an operation corresponding to the first instruction information, where the parameter information comprises one or more operation parameters that need to be acquired by the receiving device and correspond to the operation, and the first transmitting unit comprises:

a first transmitting module, configured to generate, according to the first audio signal, the first transmission signal that carries the first instruction information and the authentication information; or a second transmitting module, configured to generate, according to the first audio signal, the first transmission signal that carries the first instruction information and the parameter information; or a third transmitting module, configured to generate, according to the first audio signal, the first transmission signal that carries the first instruction information, the authentication information, and the parameter information.

9. The sending device according to claim 7, wherein the first acquiring unit comprises:

a third acquiring module, configured to acquire the first audio signal when a recognition signal indicating that a distance between the mobile terminal and the receiving device is smaller than a preset distance threshold is received, and/or acquire the first audio signal when a trigger signal sent by the receiving device is received.

10. The sending device according to claim 7, further comprising:

a receiving unit, configured to receive the first instruction information and/or operation description information of the operation corresponding to the first instruction information;

a storing unit, configured to: when the first instruction information is received, temporarily store the received first instruction information locally; and/or a third transmitting unit, configured to: when the operation description information is received, transmit the operation description information to the mobile terminal, so that the mobile terminal indicates the operation description information to a user, and so that the mobile terminal generates the first instruction information and/or the second instruction information according to input information of the user and/or the operation description information.

11. The receiving device according to claim 7, further comprising:
a second receiving unit, configured to receive a second transmission signal that is sent by the sending device and carries authentication information, wherein the second transmission signal is a light signal or a sound wave signal; and
a first transmitting unit, configured to return third instruction information to the sending device according to the received second transmission signal, so that the sending device acquires the first audio signal after receiving the returned third instruction information, or so that the sending device receives and verifies the returned third instruction information and acquires the first audio signal after the verification succeeds.

12. The receiving device according to claim 11, wherein the first transmitting unit comprises:
a transmitting module, configured to generate the third instruction information according to a preset rule and according to the authentication information acquired from the second transmission signal, where the third instruction information matches the authentication information, and return the generated third instruction information to the sending device.

13. The receiving device according to claim 7, further comprising:
a second transmitting unit, configured to send operation description information of an operation corresponding to the first instruction information to the sending device or the mobile terminal, so that the mobile terminal indicates the operation description information to a user, and so that the mobile terminal generates the first instruction information and/or the second instruction information according to input information of the user and/or the operation description information.

* * * * *